US012670460B2

(12) United States Patent
Ceniti

(10) Patent No.: US 12,670,460 B2
(45) Date of Patent: Jun. 30, 2026

(54) ARTIFICIAL INTELLIGENCE (AI) BASED SYSTEMS AND METHODS FOR ANALYZING ORDER DATA TO GENERATE A DRIVER LOGISTICS PREDICTION VALUE

(71) Applicant: CENTERA TRANSPORT, INC., Chicago, IL (US)

(72) Inventor: Alena Ceniti, Chicago, IL (US)

(73) Assignee: CENTERA TRANSPORT, INC., Chicago, IL (US)

( * ) Notice: Subject to any disclaimer, the term of this patent is extended or adjusted under 35 U.S.C. 154(b) by 0 days.

(21) Appl. No.: 17/546,277

(22) Filed: Dec. 9, 2021

(65) Prior Publication Data

US 2023/0186226 A1     Jun. 15, 2023

(51) Int. Cl.
*G06Q 10/083*          (2024.01)
(52) U.S. Cl.
CPC .................................. *G06Q 10/083* (2013.01)
(58) Field of Classification Search
CPC .............................. G06Q 10/083; G06Q 10/02
USPC .......................................................... 705/330
See application file for complete search history.

(56) References Cited

U.S. PATENT DOCUMENTS

| | | | | | |
|---|---|---|---|---|---|
| 10,354,219 | B1 * | 7/2019 | Roper | .................... | G06F 40/174 |
| 10,430,444 | B1 * | 10/2019 | Hampton | .............. | H04W 4/029 |
| 10,445,683 | B1 * | 10/2019 | Hession | .............. | G06F 16/2228 |
| 2015/0161564 | A1 * | 6/2015 | Sweeney | ................ | G06Q 50/30 |
| | | | | | 705/338 |

| | | | | | |
|---|---|---|---|---|---|
| 2015/0242944 | A1 * | 8/2015 | Willard | .................. | G06Q 10/02 |
| | | | | | 705/5 |
| 2018/0189717 | A1 * | 7/2018 | Cao | .......................... | G06Q 50/30 |
| 2019/0114564 | A1 * | 4/2019 | Ferguson | ......... | G06Q 10/06312 |
| 2019/0303857 | A1 * | 10/2019 | Lecue | ..................... | G06F 16/29 |
| 2019/0392371 | A1 * | 12/2019 | Kline | ................... | G06Q 10/083 |
| 2020/0097900 | A1 * | 3/2020 | Kibbey | ................. | G06F 16/212 |
| 2020/0380461 | A1 * | 12/2020 | Lahav | ..................... | G06N 7/01 |
| 2021/0065114 | A1 * | 3/2021 | Thompson | ....... | G06Q 10/06312 |

FOREIGN PATENT DOCUMENTS

| | | | | | |
|---|---|---|---|---|---|
| CA | 3056826 | A1 * | 3/2020 | ........... | G06F 16/212 |
| EP | 3786860 | A1 * | 3/2021 | ............. | G06F 16/29 |

* cited by examiner

*Primary Examiner* — George Chen
*Assistant Examiner* — Duane N. Moore
(74) *Attorney, Agent, or Firm* — MARSHALL, GERSTEIN & BORUN LLP

(57)          ABSTRACT

Artificial intelligence (AI) based systems and methods are described for analyzing order data to generate a driver logistics prediction value. Processors of a logistics server receive order data from order data sources corresponding to an order. A dispatch learning model then analyzes the order data to generate a driver logistics prediction value corresponding to the order data. The dispatch learning model is trained or provided with logistics data regarding order data of respective orders, and the dispatch learning model is configured to output one or more driver logistics prediction values corresponding to the order data of the respective orders. The processors generate a driver determination that identifies a driver to fulfill the order based on the driver logistics prediction value, and push the driver determination to a dispatch application. Responsive to receiving the driver determination, the dispatch app displays a graphical user interface (GUI) depicting the driver determination.

39 Claims, 15 Drawing Sheets

Figure 3A:
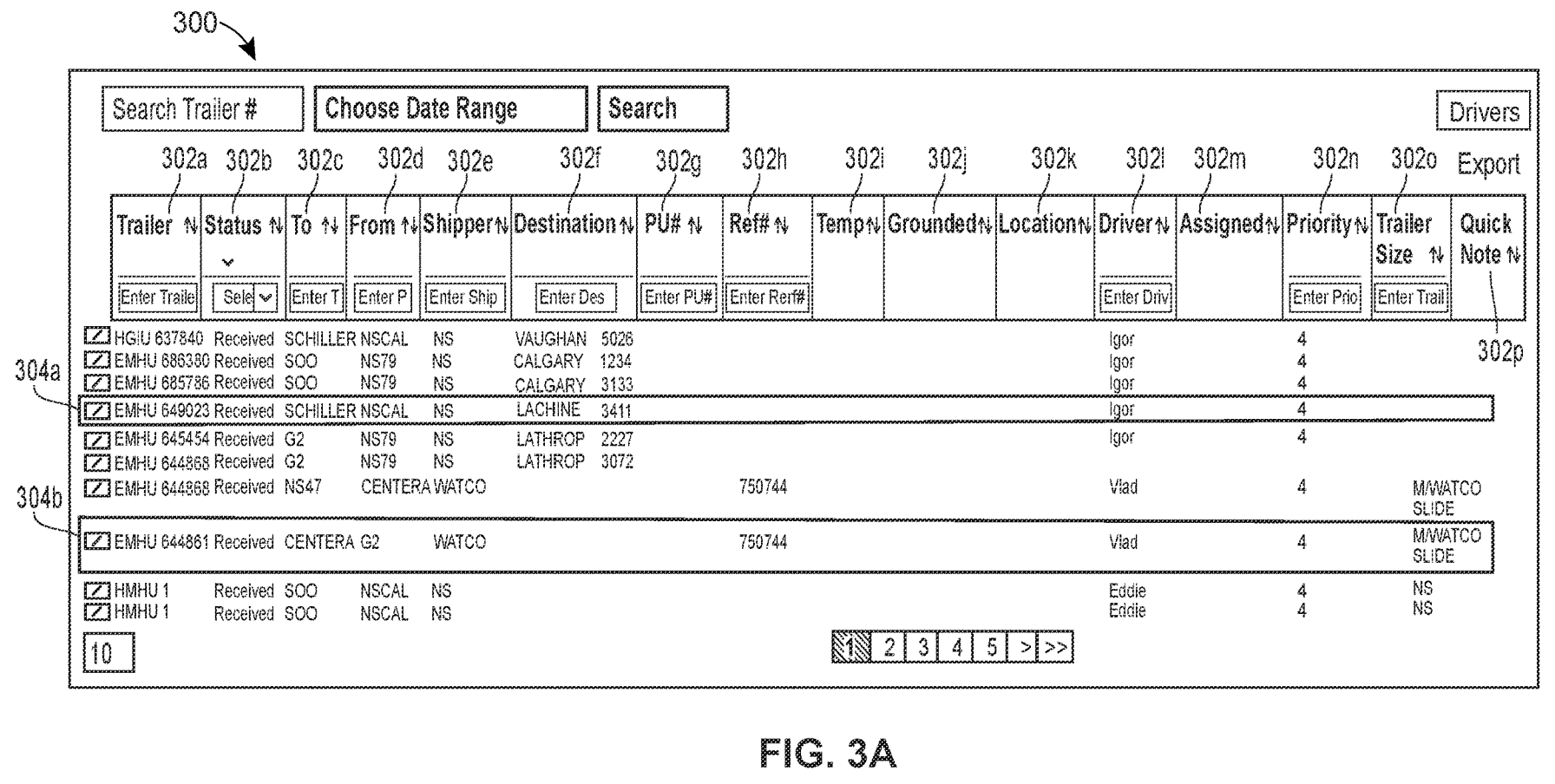

300

Search Trailer #    Choose Date Range    Search    Drivers    Export

| 302a Trailer | 302b Status | 302c To | 302d From | 302e Shipper | 302f Destination | 302g PU# | 302h Ref# | 302i Temp | 302j Grounded | 302k Location | 302l Driver | 302m Assigned | 302n Priority | 302o Trailer Size | 302p Quick Note |
|---|---|---|---|---|---|---|---|---|---|---|---|---|---|---|---|
| Enter Traile | Sele▼ | Enter T | Enter P | Enter Ship | Enter Des | Enter PU# | Enter Ref# | | | | Enter Driv | | Enter Prio | Enter Trail | |
| HGIU 637840 | Received | SCHILLER | NSCAL | NS | VAUGHAN 5026 | | | | | | Igor | | 4 | | |
| EMHU 686380 | Received | SOO | NS79 | NS | CALGARY 1234 | | | | | | Igor | | 4 | | |
| EMHU 685786 | Received | SOO | NS79 | NS | CALGARY 3133 | | | | | | Igor | | 4 | | |
| EMHU 649023 | Received | SCHILLER | NSCAL | NS | LACHINE 3411 | | | | | | Igor | | 4 | | |
| EMHU 645454 | Received | G2 | NS79 | NS | LATHROP 2227 | | | | | | Igor | | 4 | | |
| EMHU 644968 | Received | G2 | NS79 | NS | LATHROP 3072 | | | | | | vlad | | 4 | | |
| EMHU 644968 | Received | NS47 | CENTERA | WATCO | | | 750744 | | | | vlad | | 4 | M/WATCO SLIDE | |
| EMHU 644861 | Received | CENTERA | G2 | WATCO | | | 750744 | | | | Eddie | | 4 | M/WATCO SLIDE | |
| HMHU 1 | Received | SOO | NSCAL | NS | | | | | | | Eddie | | 4 | NS | |
| HMHU 1 | Received | SOO | NSCAL | NS | | | | | | | | | 4 | NS | |

ABF

| Unit | Route |
|---|---|
| UMXU 636766 — Mv ABF REZ IN NOTES | TOCSX59 FROMG2 |

MODE

| Unit | Route |
|---|---|
| UMXU 259510 — Mv mode 7/22 1500 to 7/23 1900 | TOCSX59 FROMG2 |
| UMXU 635037 — Mv mode 7/22 1500 to 7/23 1900 | TOCSX59 FROMG2 |

402a

NS

| Unit | Route |
|---|---|
| JBHU 254063 | TOBNO FROMNS47 |
| HGIU 649840 | TOSOO FROMNS47 |
| JBHU 323750 | TOBNO FROMNS47 |
| JBHU 252468 | TOBNO FROMNS47 |
| JBHU 295600 | TOSFK FROMNS47 |
| JBHU 321230 | TOSFK FROMNS47 |
| JBHU 315189 | TOSFK FROMNS47 |
| JBHU 260346 | TOSFK FROMNS47 |
| JBHU 305397 | TOSFK FROMNS47 |
| JBHU 234725 | TOSFK FROMNS47 |
| JBHU 263919 | TOSOO FROMNS47 |
| HGWU 652867 | TOSOO FROMNS47 |
| HGIU 632805 | TOSOO FROMNS47 |
| HGIU 504629 | TOSOO FROMNS47 |
| HGIU 517983 | TOG2 FROMNS47 |
| EMHU 647033 | TOG2 FROMNS47 |
| EMHU 651361 | TOG2 FROMNS47 |
| EMHU 200979 | TOG2 FROMNS47 |
| EMHU 274406 | TOG2 FROMNS47 |
| EMHU 654511 | TOG2 FROMNS47 |
| HGIU 512841 | TOG4 FROMNS47 |
| HGIU 513974 | TOG4 FROMNS47 |
| HGIU 635416 ⚠ | TOG2 FROMNS47 |
| HGIU 641312 | TOG4 FROMNS47 |

STEVENS

| Unit | Route |
|---|---|
| STTZ 16837 34"-Mv | TONS63 FROMG47 |
| STTZ 17751 45"-Mv | TONS63 FROMG2 |
| STTZ 1 34".. | TONS63 FROMG4 |
| STTZ 16491 34"-Mv STEVENS | TONS63 FROMG4 |
| STTZ 16267 50"-Mv STEVENS | TONS63 FROMG4 |
| STTZ 16244 34"-Mv STEVENS | TONS63 FROMG4 |
| STTZ 17566 99"-Mv STEVENS | TONS63 FROMG4 |
| STTZ 14815 45"-Mv | TONS63 FROMG4 |
| STTZ 17646 45"-Mv | TONS63 FROMG4 |
| STTZ 15688 99"-Mv | TOIMG FROMNS63 |
| STTZ 17979 99"-SU Mv | TOIMG FROMNSCAL |
| STTZ 14937 99"-SU Mv | TOIMG FROMNSCAL |
| STTZ 16862 99" | TOIMG FROMNSCAL |
| STTZ 17901 99" | TOIMG FROMNSCAL |
| STTZ 17889 99" | TOIMG FROMNSCAL |
| STTZ 16680 34"-Mv STEVENS | TONS63 FROMSFW |

402c

UP

| Unit | Route |
|---|---|
| EMHU 204512 Mv UP | TONS47 FROMG2 |
| EMHU 263526 Mv UP | TONS63 FROMG1 |
| EMHU 638237 Mv UP | TONS63 FROMG1 |
| EMHU 271384 Mv UP | TONS63 FROMG1 |
| EMHU 634665 Mv UP | TONS63 FROMG1 |
| HGIU 507354 Mv UP | TOSCHILLER FROMG1 |
| HGIU 511136 Mv UP | TOSCHILLER FROMG1 |
| HGIU 518647 Mv UP | TOSCHILLER FROMG1 |
| HGIU 518692 Mv UP | TOSCHILLER FROMG1 |
| HGIU 516287 Mv UP | TOSCHILLER FROMG1 |
| HGIU 505947 Mv UP | TOSCHILLER FROMG1 |
| EMHU 651155 Mv UP | TONS47 FROMG1 |
| EMHU 270786 Mv UP | TONS47 FROMG1 |
| EMHU 201363 Mv UP | TONS47 FROMG1 |
| EMHU 260978 Mv UP | TONS47 FROMG1 |
| EMHU 641095 Mv UP | TOSCHILLER FROMG1 |
| EMHU 641829 Mv UP | TOSCHILLER FROMG1 |
| EMHU 652492 Mv UP | TOSCHILLER FROMG1 |
| EMHU 654497 Mv UP | TOSCHILLER FROMG1 |
| XPOU 422716 Mv UP | TOSOO FROMG1 |
| EMHU 264849 Mv UP | TONS63 FROMG1 |
| EMHU 830594 Mv UP | TONS47 FROMG2 |
| EMHU 275015 Mv UP | TONSCAL FROMG2 |
| HGIU 504580 Mv UP | TONSCAL FROMG2 |

BNSF

| Unit | Route |
|---|---|
| NONZ 339409 (UPS) 28"-Mv 1930 | TOCSXBP FROMSFW |
| UPSZ 841915 (UPS) Mv 300 | TONS63 FROMSFW |
| FDXU 534576 Mv 1200 230 | TONS63 FROMSFW |
| FDXU 532000 Mv 1200 230 | TONS63 FROMSFW |
| FDXU 532519 Mv 1700 230 | TONS63 FROMSFW |
| CRST 810912 Mv 0001 | TONSCAL FROMSFW |

CLIPPER

| Unit | Route |
|---|---|
| AXXZ 553427 42"-Mv 7/20 0300 TO 7/21 0300 | TOCSXBP FROMG2 |
| UMXU 248687 Mv CLIPPER CHECK REZ | TOCSXBP FROMG4 |
| UMXU 891636 Mv CLIPPER CK REZ | TOCSXBP FROMG4 |
| AXXZ 548709 Mv CLIPPER CK REZ | TOCSXBP FROMSFW |
| AXXZ 953014 36"-Mv 7/20 0300 TO 7/21 0300 | TOCSXBP FROMSFW |
| AXXZ 953023 55"-Mv CLIPPER | TOSFN FROMNS63 |

INFINITY

| Unit | Route |
|---|---|
| INYU 500322 -10"-Mv 7/20 07:00 - TO 7/21 07:00 | TOCSXBP FROMBNO |
| INYU 500313 -10"-Mv infinity eta 7/22 | TOBNO FROMCSXBP |

FIG. 4
(to be continued)

(continuation)

322

| Type | Status |
|---|---|
| Load ⌄ | Received ⌄ |
| Trailer # | To SCHILLER |
| HGIU 637840 | From NSCAL |
| Shipper | Destination |
| NS ⌄ | VAUGHAN |

Train ID

[                          ]

Grounded Time

MM/DD/YYYY --:-- --          🗓

Assigned Time

MM/DD/YYYY --:-- --          🗓

In-Gate Time

MM/DD/YYYY --:-- --          🗓

Out-Gate Time

MM/DD/YYYY --:-- --          🗓

| P.U. # | Priority |
|---|---|
| 5026 | Automatic ⌄ |
| Customer/Ref. # | Driver/Assigned |
| [          ] | Igor ▽          ✕ |
| Temperature | Trailer Size |
| [          ] | [          ] |

◉ UPS    ◉ HAZ    ◉ BAD

Quick Notes:

[                          ]

Full Notes:

[                          ]

| Save | Cancel |   | Batch Create | 0 |
|---|---|---|---|---|

EMHU 2045

| | | |
|---|---|---|
| 🧩 | Search moves for "EMHU 204512" | |
| 🧹 | Tab Suspender | ▶ |
| | Inspect | Ctrl+Shift+I |

610

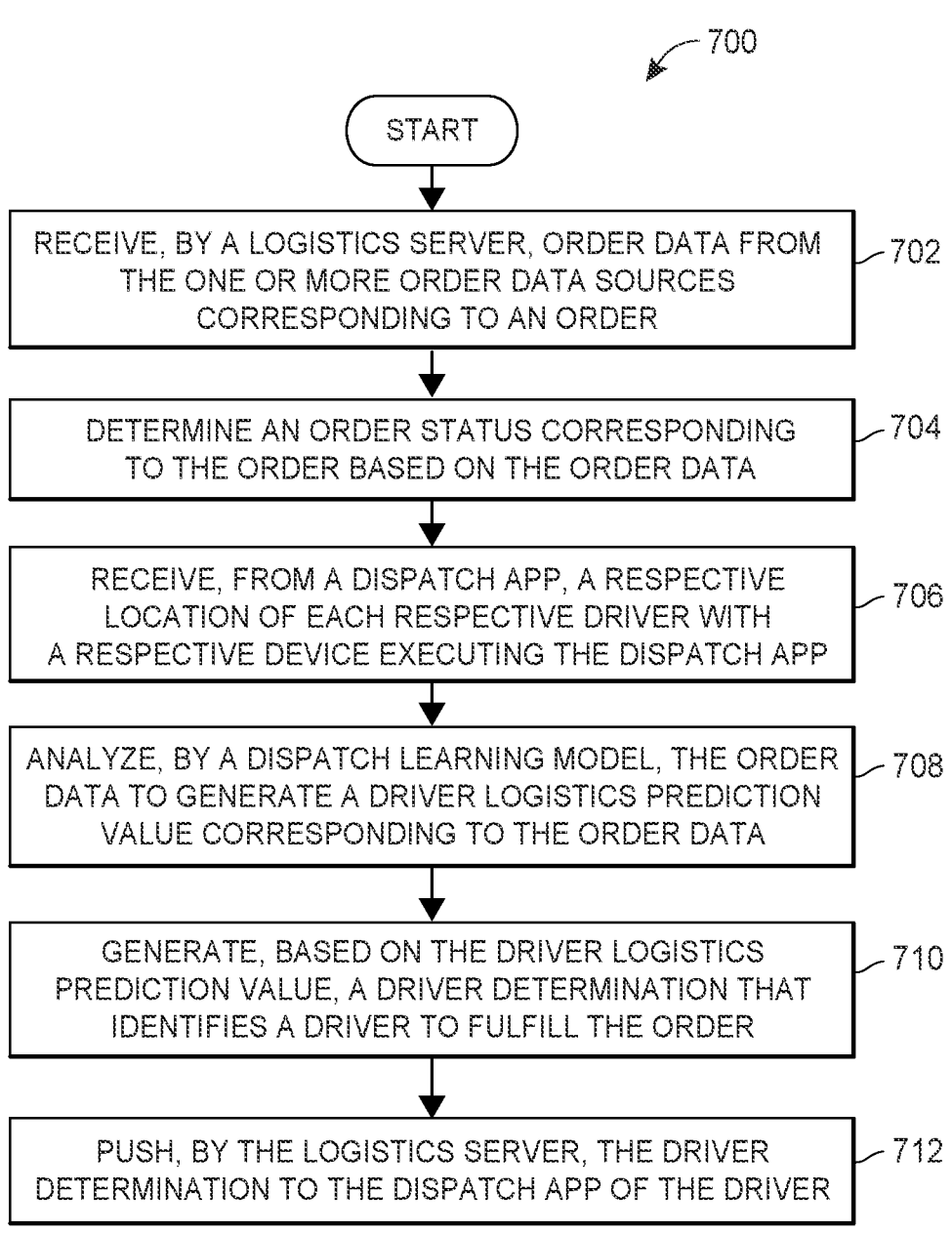

*700*

START

RECEIVE, BY A LOGISTICS SERVER, ORDER DATA FROM THE ONE OR MORE ORDER DATA SOURCES CORRESPONDING TO AN ORDER  — 702

DETERMINE AN ORDER STATUS CORRESPONDING TO THE ORDER BASED ON THE ORDER DATA  — 704

RECEIVE, FROM A DISPATCH APP, A RESPECTIVE LOCATION OF EACH RESPECTIVE DRIVER WITH A RESPECTIVE DEVICE EXECUTING THE DISPATCH APP  — 706

ANALYZE, BY A DISPATCH LEARNING MODEL, THE ORDER DATA TO GENERATE A DRIVER LOGISTICS PREDICTION VALUE CORRESPONDING TO THE ORDER DATA  — 708

GENERATE, BASED ON THE DRIVER LOGISTICS PREDICTION VALUE, A DRIVER DETERMINATION THAT IDENTIFIES A DRIVER TO FULFILL THE ORDER  — 710

PUSH, BY THE LOGISTICS SERVER, THE DRIVER DETERMINATION TO THE DISPATCH APP OF THE DRIVER  — 712

Routes        Add route        806

WED    THU    FRI    SAT    SAN
23     24     25     26     27

Scheduled        808

HGIU 634547
Up next · 0/2 completed

START    BNSF - Cicero
         Depart Jun 25, 2021 12:39 PM
         CDT

END      CSX - 59th Street
         Arrive Jun 25, 2021 1:00PM CDT

10:46

89%

ARTIFICIAL INTELLIGENCE (AI) BASED SYSTEMS AND METHODS FOR ANALYZING ORDER DATA TO GENERATE A DRIVER LOGISTICS PREDICTION VALUE

FIELD

The present disclosure generally relates to artificial intelligence (AI) based systems and methods, and more particularly to, AI based systems and methods for analyzing order data to generate a driver logistics prediction value.

BACKGROUND

Generally, the transportation or otherwise shipping industry is an integral component of modern society, including a large array of shipping mediums (e.g., railroads, airplanes, etc.) and an even larger number of shipping companies. For example, there are six Class I railroads in the Chicagoland area. Two of these railroads service the east coast (e.g., Norfolk Southern (NS) and CSX), two service the west coast (Burlington Northern Santa Fe (BNSF) and Union Pacific (UP)), and two service Canada (Canadian Pacific (CP) and Canadian National (CN)). When a unit is shipped across the United States, the unit is typically shipped to the Midwest/ Chicago by one of these railroads.

When a unit arrives, the unit requires transportation to its connecting railroad in order for the unit to arrive at its destination on time (a "cross-town" transport). Thousands of these units are delivered by different railroads on different trains and at different times. Each receiving railroad has a cut-off time per destination, and if the unit misses the cut-off time, the unit remains at the receiving location until the next cut-off, which can be anywhere from 12-24 hours. Alternatively, the unit may be trucked over-the-road to make its appointment. Regardless, when a unit misses the cut-off time, the railroads incur additional costs and suffer reduced efficiency as a result.

The railroads make the most money and reach high levels of customer satisfaction based on their efficiency (i.e., trains in and out on time with the correct units on board). Practically speaking, railroad yards have limited space, but the yards can hold trains on holding tracks for days until there is enough space available in the yard to bring the trains in for unloading. Conventionally, there are too few trucks to move the units quickly and efficiently. This causes costly delays as the units occupy valuable parking spaces, miss their cut-offs at the connecting railroads, incur storage charges, and certain units are trucked over-the-road resulting in thousands of dollars per long haul.

Moreover, railroads frequently run low on chassis to mount the units unloaded from arriving trains, and the units arriving at a rail yard do not always equal the units departing the rail yard. Thus, this unit arriving/departing discrepancy causes further delays until the railroads have enough chassis to ground each train. For these reasons, it can take days/ weeks for a receiving railroad to have enough chassis to load/unload each arriving train appropriately to make all corresponding cut-offs.

As a result of these and other issues, many drivers forgo cross-town work in favor of other types of trucking. The growing dearth of drivers is leading to increased congestion in the rail yards, and railroads may place embargos on certain destinations that lack sufficient trucking to accommodate cross-town transportation. All of these concerns result in additional costs to the railroads, and by extension, the shipping customers as railyards become overwhelmingly congested and the limited storage options become increasingly scarce. Such problems lead to less efficient logistics and transport for moving physical items through various geographic locations.

For the foregoing reasons, there is a need for AI based systems and methods for analyzing order data to generate a driver logistics prediction value.

SUMMARY

Artificial intelligence (AI) based systems and methods are described herein for analyzing order data to generate a driver logistics prediction value. In some aspects, AI based systems and methods herein are configured to train AI models to analyze input order data to generate a driver logistics prediction value corresponding to the order data. Such AI based systems provide an AI based solution for overcoming problems that arise from the difficulties in ingesting and analyzing logistics corresponding to large volumes of order data received from multiple order data sources.

Generally, the AI based systems as described herein allow a user to receive/aggregate order data at a logistics server(s) (e.g., including its one or more processors), or otherwise a computing device (e.g., such as locally on the user's computing device), where the logistics server(s) or user computing device, implements or executes an AI based learning model (which may be referenced herein as a "dispatch learning model") trained or provided with logistics data of potentially thousands of instances (or more) of order data of respective orders. The dispatch learning model may generate, based on a driver logistics prediction value, a driver determination that identifies a driver to fulfill an order. For example, the order data may comprise a plurality of dispatch intake forms, and/or data extracted, e.g., via optical character recognition (OCR), therefrom, including arrival times, arrival locations, departure locations, departure times, cut-off times, prioritization levels, payment amounts, and/or other logistics factors corresponding to a respective order. The driver determination may be pushed from the logistics server via a computer network to a dispatch application (app) executing on a user computing device of a driver for rendering on a display screen of the user computing device. In various aspects, such rendering may include graphical representations, overlays, annotations, and the like for displaying the driver determination based on the driver logistics prediction value.

As a result, rather than each transportation customer (e.g., railroads, shippers, steamship-lines, chassis providers) dispatching cross-towns to a limited number of local trucking companies in a particular area, the AI based systems and methods described herein allow transportation customers to access thousands of trucking companies from outside of the particular area to accept units for cross-town transport to another location. Thus, the AI based systems and methods of the present disclosure substantially increase the number of drivers available for cross-town and other short-term transportation work and maximize the efficiency and resources of these drivers, many of whom may only transiently remain in a particular location. Importantly, the AI based systems and method, as disclosed herein, provide a computerized solution that allows for the efficient movement and increased logistical efficiency of real-world, physical items (e.g., shipping units, trailers, containers, etc.) in one or more geographical locations, including those geographical locations that can result in physical bottlenecks or gridlocks, such as railroads and other transportation centers, including by way of non-limiting example, the transportation hub of the Chicagoland or otherwise Midwest area of the United States.

More specifically, as described herein, an AI based system is disclosed. The AI based system is configured to analyze order data to generate a driver logistics prediction value. The AI based system comprises a logistics server configured to ingest order data from one or more order data sources, and a dispatch learning model. The logistics server comprises computing instructions configured to execute on one or more processors of the logistics server, and the logistics server is communicatively coupled to a dispatch application (app). The dispatch learning model is accessible by the logistics server, and is trained or provided with logistics data regarding order data of respective orders. The dispatch learning model is configured to output one or more driver logistics prediction values corresponding to the order data of the respective orders. The computing instructions, when executed by the one or more processors of the logistics server, cause the one or more processors of the logistics server to: receive, by the logistics server, order data from the one or more order data sources corresponding to an order; analyze, by the dispatch learning model, the order data to generate a driver logistics prediction value corresponding to the order data; generate, based on the driver logistics prediction value, a driver determination that identifies a driver to fulfill the order; and push, by the logistics server, the driver determination to the dispatch app of the driver. Responsive to receiving the driver determination, the computing instructions cause the dispatch app to display a graphical user interface (GUI) including the driver determination.

In addition, as described herein, an artificial intelligence (AI) based method is disclosed for analyzing order data to generate a driver logistics prediction value. The AI based method comprises receiving, at one or more processors of a logistics server, order data from one or more order data sources corresponding to an order; analyzing, by a dispatch learning model, the order data to generate a driver logistics prediction value corresponding to the order data, wherein the dispatch learning model is trained or provided with logistics data regarding order data of respective orders, and the dispatch learning model is configured to output one or more driver logistics prediction values corresponding to the order data of the respective orders; generating, by the one or more processors, a driver determination that identifies a driver to fulfill the order based on the driver logistics prediction value; and pushing, by the one or more processors, the driver determination to a dispatch application (app) of the driver, wherein, responsive to receiving the driver determination, the dispatch app displays a graphical user interface (GUI) depicting the driver determination.

Further, as described herein, a tangible, non-transitory computer-readable medium storing instructions for analyzing order data to generate a driver logistics prediction value is disclosed. The instructions, when executed by one or more processors, may cause the one or more processors to: receive order data from one or more order data sources corresponding to an order; analyze, by a dispatch learning model, the order data to generate a driver logistics prediction value corresponding to the order data, wherein the dispatch learning model is trained or provided with logistics data regarding order data of respective orders, and the dispatch learning model is configured to output one or more driver logistics prediction values corresponding to the order data of the respective orders; generate a driver determination that identifies a driver to fulfill the order based on the driver logistics prediction value; and push the driver determination to a dispatch application (app) of the driver, wherein, responsive to receiving the driver determination, the dispatch app displays a graphical user interface (GUI) depicting the driver determination.

In accordance with the above, and with the disclosure herein, the present disclosure includes improvements in computer functionality or in improvements to other technologies at least because the disclosure describes that, e.g., a logistics server, or otherwise computing device (e.g., a user computer device), is improved where the intelligence or predictive ability of the logistics server or computing device is enhanced by a trained (e.g., machine learning trained) dispatch learning model. The dispatch learning model, executing on the logistics server or computing device, is able to more accurately identify/generate, based on order data of respective orders, a driver logistics prediction value corresponding to the order data and a driver determination that identifies a driver to fulfill the order. That is, the present disclosure describes improvements in the functioning of the computer itself or "any other technology or technical field" because a logistics server or user computing device is enhanced with a plurality of logistics data (e.g., potentially thousands of instances (or more) of order data regarding respective orders, as may be generated from data capture, such as OCR) to accurately predict, detect, or otherwise determine driver logistics prediction values and driver determinations based on order data from one or more data sources, such as newly provided order data. This improves over the prior art at least because existing systems lack such predictive or classification functionality and are simply not capable of accurately analyzing order data to output a predictive result to identify a driver to fulfill the order.

Specifically, the systems and methods of the present disclosure feature improvements over conventional techniques by training the dispatch learning model with a logistics data regarding order data (e.g., arrival times, departure times, cut-off times, etc.) of respective orders. Once trained using the logistics data, the dispatch learning model provides high-accuracy driver logistics prediction values for a user (e.g., dispatcher, railroad, etc.) to a degree that is unattainable using conventional techniques. Moreover, in certain aspects, the logistics data used to train the dispatch learning model, as well as the order data used as input to the dispatch learning model, includes a plurality of formats. In these aspects, the dispatch learning model may be trained to standardize the formatting of the logistics data and/or order data into a universal format in order to efficiently and accurately generate a driver logistics prediction value for each respective order data in a manner that is unachievable using conventional techniques.

For similar reasons, the present disclosure relates to improvements to other technologies or technical fields at least because the present disclosure describes or introduces improvements to computing devices in the transportation logistics field, whereby the trained dispatch learning model executing on the logistics server(s) or computing devices improves the field of transportation logistics with AI based analysis of order data to output a predictive result identifying a driver to fulfill an order.

Further, the present disclosure relates to improvement to other technologies or technical fields at least because the present disclosure describes or introduces improvements to computing devices in the transportation logistics field, whereby the trained dispatch learning model executing on the logistics server(s) and/or computing devices improve the underlying computer device (e.g., logistics server(s) and/or user computing device), where such computer devices are made more efficient by the configuration, adjustment, or adaptation of a given machine-learning network architecture. For example, in some aspects, fewer machine resources (e.g., processing cycles or memory storage) are used by decreasing computational resources by decreasing machine-learning network architecture needed to analyze order data, including by reducing depth, width, and/or other machine-learning based dimensionality requirements. Such reduction frees up the computational resources of an underlying computing system, thereby making it more efficient.

Also, the underlying system has an improves the field of transportation and shipping in that the underlying system has an impact on the logistics and movement of physical items. That is, the AI based systems and method, as disclosed herein, provide a computerized solution that allows for the efficient movement and increased logistical efficiency of real-world, physical items (e.g., shipping units, trailers, containers, etc.) in one or more geographical locations, including those geographical locations that can result in physical bottlenecks or gridlocks, such as railroads and other transportation centers, including by way of non-limiting example, the transportation hub of the Chicagoland or otherwise Midwest area of the United States.

In addition, the present disclosure includes applying certain of the claim elements with, or by use of, a particular machine, e.g., a logistics server, which receives the logistics data used to train the dispatch learning model, as described herein.

In addition, the present disclosure includes specific features other than what is well-understood, routine, conventional activity in the field, or adding unconventional steps that confine the claim to a particular useful application, e.g., an AI based system configured analyze order data from one or more data sources to generate a driver logistics prediction value and a driver determination that identifies a driver to fulfill the order corresponding to the order data.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an aspect of a particular aspect of the disclosed system and methods, and that each of the Figures is intended to accord with a possible aspect thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present aspects are not limited to the precise arrangements and instrumentalities shown, wherein:

FIG. 3A illustrates an example order data table having order data that may be used as inputs of a dispatch learning model, in accordance with various aspects disclosed herein.

FIG. 5A illustrates the edit pane from the example user interface of FIG. 3B that is associated with the dispatch learning model of FIG. 1, in accordance with various aspects disclosed herein.

FIG. 7 illustrates an example AI based method for analyzing order data to generate a driver logistics prediction value, in accordance with various aspects disclosed herein.

The Figures depict preferred aspects for purposes of illustration only. Alternative aspects of the systems and methods illustrated herein may be employed without departing from the principles of the invention described herein.

DETAILED DESCRIPTION OF THE INVENTION

Figure 1:
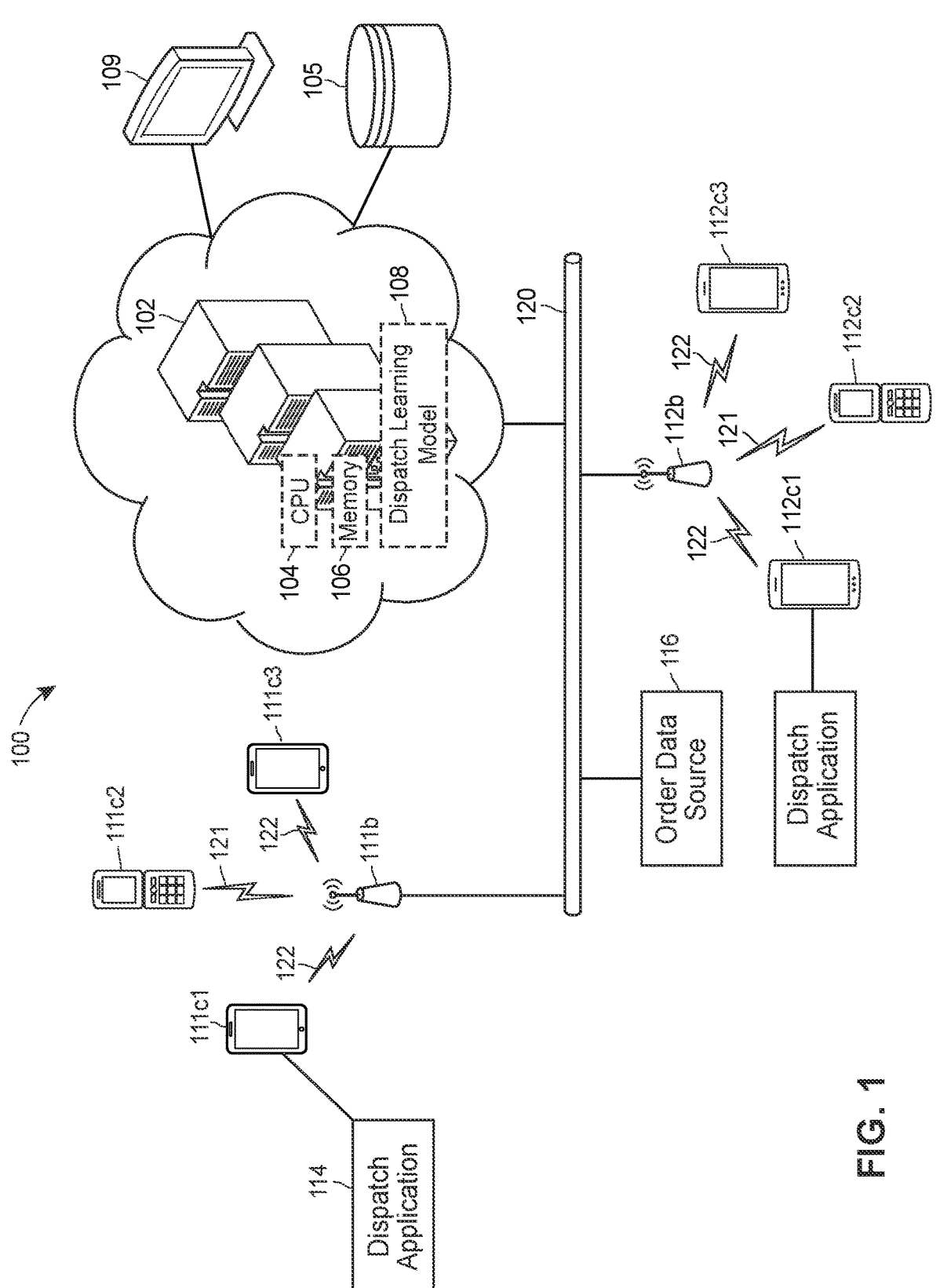
FIG. 1 illustrates an example artificial intelligence (AI) based system configured to analyze order data to generate a driver logistics prediction value, in accordance with various aspects disclosed herein.

FIG. 1 illustrates an example artificial intelligence (AI) based system 100 configured to analyze order data to generate a driver logistics prediction value. Generally, as referred to herein, the order data may include inputs from one or more data sources comprise information or data corresponding to the condition/status of respective orders. For example, the order data may include an input from a data source indicating when an order arrived at an arrival location, and that the order is grounded and ready for transportation to the destination location.

In the example aspect of FIG. 1, the AI based system 100 includes logistics server(s) 102, which may comprise one or more computer servers. In various aspects the logistics server(s) 102 comprise multiple servers, which may comprise multiple, redundant, or replicated servers as part of a server farm. In still further aspects, the logistics server(s) 102 may be implemented as cloud-based servers, such as a cloud-based computing platform. For example, the logistics server(s) 102 may be any one or more cloud-based platform(s) such as MICROSOFT AZURE, AMAZON AWS, or the like. The logistics server(s) 102 may include one or more processor(s) 104, one or more computer memories 106, and a dispatch learning model 108.

The memories 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memorie(s) 106 may store an operating system (OS) (e.g., Microsoft Windows, Linux, UNIX, etc.) capable of facilitating the functionalities, apps, methods, or other software as discussed herein. The memorie(s) 106 may also store the dispatch learning model 108, which may be a machine learning model, trained on various logistics data (e.g., potentially thousands of instances (or more) of order data regarding respective orders), as described herein. Additionally, or alternatively, the dispatch learning model 108 may also be stored in database 105, which is accessible or otherwise communicatively coupled to the logistics server(s) 102. In addition, memories 106 may also store machine readable instructions, including any of one or more application(s) (e.g., a dispatch application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein.

For example, the memories 106 may include/store an API configured to enable order data transfer between the order data source(s) 116 and the logistics server(s) 102. Additionally, or alternatively, the memories 106 may include software comprising a scraper tool configured to acquire order data from the order data source(s) 116. This software may be downloaded directly into a website or other suitable location to work as part of a website extension (e.g., GOOGLE CHROME extension) that is configured to automatically retrieve order data and transmit the order data to the logistics server(s) 102 for updating the stored records corresponding to pending orders. Moreover, at least some of the applications, software components, or APIs may be, include, otherwise be part of, an AI based machine learning model or component, such as the dispatch learning model 108, where each may be configured to facilitate their various functionalities discussed herein. It should be appreciated that one or more other applications may be envisioned and that are executed by the processor(s) 104.

The processor(s) 104 may be connected to the memories 106 via a computer bus responsible for transmitting electronic data, data packets, or otherwise electronic signals to and from the processor(s) 104 and memories 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory 106 via the computer bus to execute an operating system (OS). Processor(s) 104 may also interface with the memory 106 via the computer bus to create, read, update, delete, or otherwise access or interact with the data stored in memories 106 and/or the database 105 (e.g., a relational database, such as Oracle, DB2, MySQL, or a NoSQL based database, such as MongoDB). The data stored in memories 106 and/or database 105 may include all or part of any of the data or information described herein, including, for example, logistics data (e.g., as scanned, OCRed, captured, or otherwise collected from the order data source(s) 116) and/or other information corresponding to respective orders, including arrival time/location, departure time/location, cut-off time, payment amounts, or the like, or as otherwise described herein.

The logistics server(s) 102 may further include a communication component configured to communicate (e.g., send and receive) data via one or more external/network port(s) to one or more networks or local terminals, such as computer network 120 and/or terminal 109 (for rendering or visualizing) described herein. In some aspects, the logistics server(s) 102 may include a client-server platform technology such as ASP.NET, Java J2EE, Ruby on Rails, Node.js, a web service or online API, responsive for receiving and responding to electronic requests. The logistics server(s) 102 may implement the client-server platform technology that may interact, via the computer bus, with the memories(s) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein. For example, the logistics server(s) 102 may be configured to enable a user to access an order management website that displays some/all collected order data, thereby allowing the user to manage pending orders as well as historical order data for billing purposes.

In various aspects, the logistics server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some aspects, computer network 120 may comprise a private network or local area network (LAN). Additionally, or alternatively, computer network 120 may comprise a public network such as the Internet.

The logistics server(s) 102 may further include or implement an operator interface configured to present information to an administrator or operator and/or receive inputs from the administrator or operator. As shown in FIG. 1, an operator interface may provide a display screen (e.g., via terminal 109). The logistics server(s) 102 may also provide I/O components (e.g., ports, capacitive or resistive touch sensitive input panels, keys, buttons, lights, LEDs), which may be directly accessible via, or attached to, the logistics server(s) 102 or may be indirectly accessible via or attached to terminal 109. According to some aspects, an administrator or operator may access the logistics server(s) 102 via terminal 109 to review information, make changes, input logistics data, initiate training of the dispatch learning model 108, interact with any of the GUIs as illustrated and/or described herein, and/or perform other functions as described herein.

As described herein, in some aspects, the logistics server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memories 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, the logistics server(s) 102 are communicatively connected, via computer network 120 to the one or more user computing devices 111c1-111c3 and/or 112c1-112c3 via base stations 111b and 112b. In some aspects, base stations 111b and 112b may comprise cellular base stations, such as cell towers, communicating to the one or more user computing devices 111c1-111c3 and 112c1-112c3 via wireless communications 121 based on any one or more of various mobile phone standards, including NMT, GSM, CDMA, UMMTS, LTE, 5G, or the like. Additionally, or alternatively, base stations 111b and 112b may comprise routers, wireless switches, or other such wireless connection points communicating to the one or more user computing devices 111c1-111c3 and 112c1-112c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 and/or 112c1-112c3 may comprise mobile devices and/or client devices for accessing and/or communications with the logistics server(s) 102. Such client devices may comprise one or more mobile processor(s) and one or more mobile memorie(s). In various aspects, user computing devices 111c1-111c3 and/or 112c1-112c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or table.

In certain aspects, any of the user computing devices (illustrated in FIG. 1 as devices 111c1 and 112c1) may include a dispatch application 114 configured to receive driver determinations and/or other notifications or combinations thereof pushed from the logistics server(s) 102. The dispatch application 114 may additionally be configured to transmit location information corresponding to the current location of the respective user computing device 111c1, 112c1 upon request from the logistics server(s) 102 and/or at a predetermined frequency when the dispatch application 114 is open on the respective user computing device 111c1, 112c1. For example, a driver may carry user computing device 112c1 into a vehicle, and may activate the dispatch application 114 prior to operating the vehicle to a destination. Upon activation and/or at any suitable time after activation, the dispatch application 114 may transmit location information corresponding to the current location of the user computing device 112c1, and by association, the driver and the vehicle. The dispatch learning model 108 may generate a driver logistics prediction value indicating that the driver is ideal for transporting a particular order based on the location received from the dispatch application 114, and as a result, the logistics server(s) 102 may push a driver determination to the driver for display on a user interface of the user computing device 112c1, as described herein. The dispatch application 114 may be any suitable dispatch application, such as the SAMSARA DRIVER app.

In various aspects, the one or more user computing devices 111c1-111c3 and/or 112c1-112c3 may implement or execute an operating system (OS) or mobile platform such as APPLE's iOS and/or GOOGLE's ANDROID operation system. Any of the one or more user computing devices 111c1-111c3 and/or 112c1-112c3 may comprise one or more processors and/or one or more memories for storing, implementing, or executing computing instructions or code, e.g., a mobile application (e.g. dispatch application 114) or a home or personal assistant application, as described in various aspects herein. In certain aspects, the dispatch learning model 108 as described herein, or at least portions thereof, may also be stored locally on a memory of a user computing device (e.g., user computing device 111c1).

User computing devices 111c1-111c3 and/or 112c1-112c3 may comprise a wireless transceiver to receive and transmit wireless communications 121 and/or 122 to and from base stations 111b and/or 112b. In various aspects, logistics data (e.g., order data corresponding to respective orders) may be transmitted via computer network 120 to the server(s) 102 for training of model(s) (e.g., dispatch learning model 108) and/or analysis as described herein.

Still further, each of the one or more user computer devices 111c1-111c3 and/or 112c1-112c3 may include a display screen for displaying graphics, images, text, driver determinations, data, pixels, features, and/or other such visualizations or information as described herein. In various aspects, graphics, images, text, driver determinations, data, pixels, features, and/or other such visualizations or information may be received from the logistics server(s) 102 for display on the display screen of any one or more of user computer devices 111c1-111c3 and/or 112c1-112c3. Additionally, or alternatively, a user computing device 111c1-111c3 and/or 112c1-112c3 may comprise, implement, have access to, render, or otherwise expose, at least in part, an interface or a graphical user interface (GUI) for displaying text and/or images on its display screen.

In some aspects, computing instructions and/or applications executing at the server (e.g., logistics server(s) 102) and/or at a mobile device (e.g., user computing device 111c1) may be communicatively connected for analyzing order data from one or more data sources corresponding to an order to generate a driver logistics prediction value and a driver determination, as described herein. For example, one or more processors (e.g., processor(s) 104) of logistics server(s) 102 may be communicatively coupled to a mobile device via a computer network (e.g., computer network 120).

Additionally, the logistics server(s) 102 and the one or more user computing devices 111c1-111c3 and 112c1-112c3 may be communicatively coupled (e.g., by computer network 120) to one or more order data source(s) 116. The one or more data source(s) 116 may generally include any data source where order data is generated, aggregated, and/or compiled, and the logistics server(s) 102 may receive/extract data from the one or more data source(s) 116 by an API. For example, in some aspects, that the logistics server(s) 102 is configured to receive order data from two different railroads, where that the first railroad submits order data to the logistics server(s) 102 through electronic communication(s) (e.g., emails) and the second railroad posts order data on a webpage. In this aspect, the one or more order data source(s) 116 includes both the electronic communication(s) from the first railroad and the webpage of the second railroad. The logistics server(s) 102 may automatically extract order data from the electronic communication(s) (e.g., through text recognition, such as OCR, etc.), and the server(s) 102 may scrub and/or otherwise search for relevant order data from the webpage. Thus, it is to be understood that the one or more order data source(s) 116 illustrated in FIG. 1 may include any suitable data source that may be communicatively coupled to the logistics server(s) 102, and that includes order data corresponding to an order.

Figure 2:
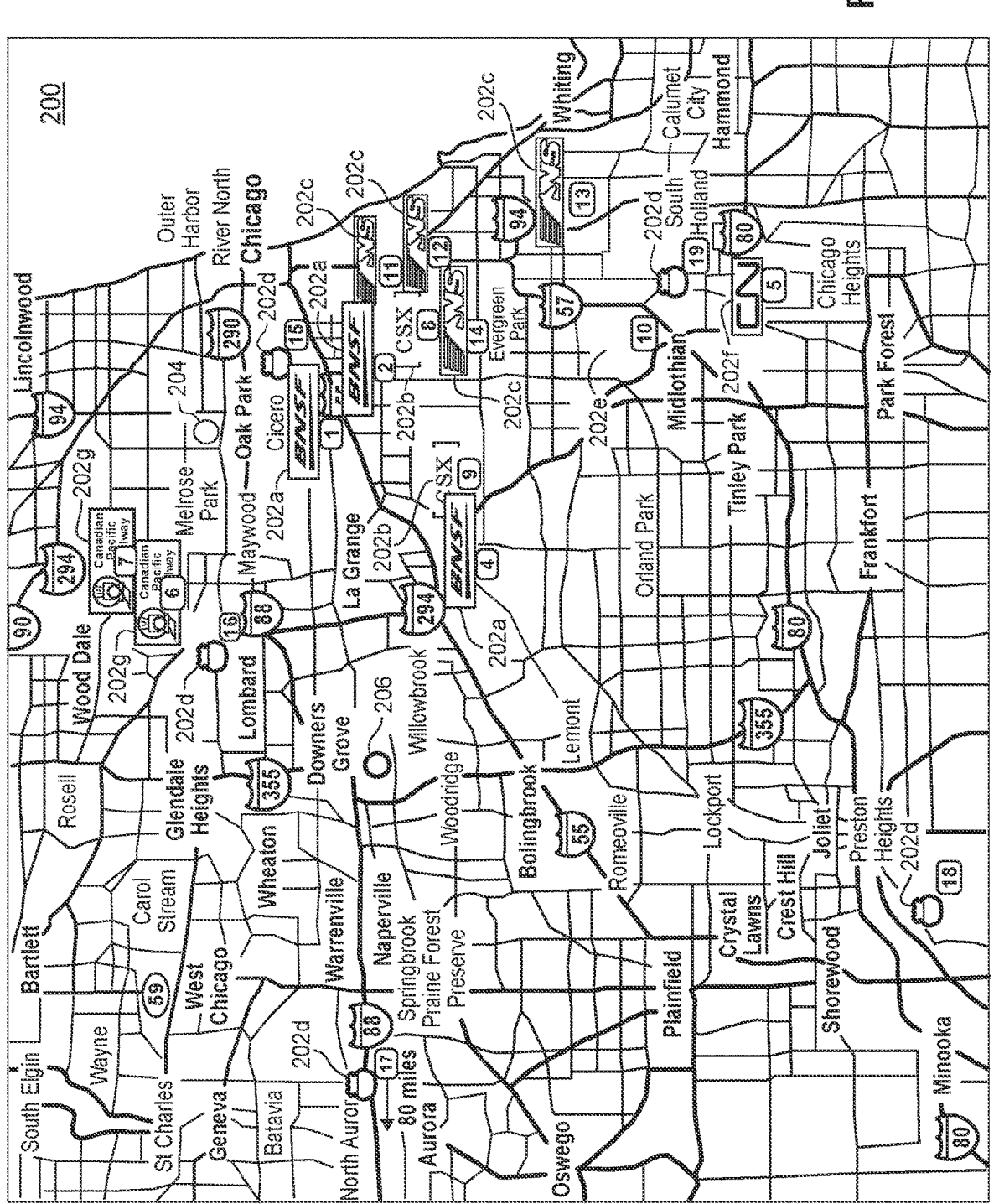
FIG. 2 illustrates an example map comprising logistics data or information that may be used for training and/or implementing a dispatch learning model, in accordance with various aspects disclosed herein.

FIG. 2 illustrates an example map 200 that may be used for training and/or implementing a dispatch learning model, in accordance with various aspects disclosed herein. Generally speaking, the example map 200 may illustrate the number and types of facilities/locations and/or data sources a dispatch learning model (e.g., dispatch learning model 108) may utilize in order to generate a driver logistics prediction value and/or a driver determination. For example, the example map 200 includes a plurality of markers 202a-202g that may each represent railway terminals through which a particular railroad may operate, a first current driver location 204, and a second current driver location 206. Each of the plurality of markers 202a-202g may additionally indicate the particular railroad (e.g., NS, BNSF, etc.) from which the dispatch learning model 108 may receive/obtain order data in order to generate the driver logistics prediction value and/or the driver determination. For ease of discussion, the driver locations featured on the example map 200 comprise two locations, but it is to be understood that the dispatch learning model 108 may ingest any suitable number of current driver locations when generating a driver logistics prediction value and/or a driver determination.

A first user computing device may track the first current driver location 204 (e.g., by the dispatch application 114), and a dispatch learning model (e.g., dispatch learning model 108) may request the first current driver location 204 from the first user computing device. Similarly, a second user computing device may track the second current driver location 206 (e.g., by the dispatch application 114), and the dispatch learning model 108 may request the second current driver location 206 from the second user computing device. The dispatch learning model 108 may utilize the first current driver location 204 and the second current driver location 206 in tandem with order data received from one or more data sources to determine whether or not the first driver at the first current driver location 204 or the second driver at the second current driver location 206 is optimally positioned to transport an order. For example, assume that the order includes transporting a unit from one of the railway terminals represented by markers 202g to one of the railway terminals represented by markers 202c. In this example, the dispatch learning model 108 may determine that the first driver is more optimally positioned to accept the order (in part) because the first current driver location 204 is more proximate to both the pickup location (202g) and the drop-off location (202c).

Additionally, there may be dozens of additional facilities (not shown) which can be added to the example map 200 and which may be included or otherwise indicated as part of the order data received/utilized by the dispatch learning model 108. For example, the additional facilities may include container yards, equipment depots, over flow facilities, repair facilities, facilities configured to accommodate special requests per customer instructions, and/or any other suitable facilities or combinations thereof that may be indicated in the order data received/utilized by the dispatch learning model 108.

Further, in certain aspects, the example map 200 may represent a graphical display that is rendered on a user interface of a user computing device (e.g., user computing device 112c1) as part of the execution of a dispatch application (e.g., dispatch application 114). In these aspects, the graphical rendering of the example map 200 may include some and/or all of the plurality of markers 202a-202g, and may include some and/or all of the current driver locations (e.g., 204, 206). For example, the first driver and the second driver (from the above example) may each individually execute the dispatch application 114, and may view a graphical rendering of the example map 200. In this example, the graphical display viewed by both drivers may include each of the plurality of markers 202a-202g, but the graphical rendering displayed for the first driver may only additionally include the first current driver location 204, and the graphical rendering displayed for the second driver may only additionally include the second current driver location 206. In this manner, each respective driver may receive a graphical rendering similar to the example map 200 that may only include the current location of the respective driver.

FIG. 3A illustrates an example order data table 300 having order data that may be used as inputs of a dispatch learning model (e.g., dispatch learning model 108), in accordance with various aspects disclosed herein. The example order data table 300 may generally include order data corresponding to one or more orders, and the order data may be received from one or more order data sources. Moreover, the order data included as part of the example order data table 300 may include inputs and/or outputs of a dispatch learning model (e.g., dispatch learning model 108). As shown in FIG. 3A, the example order data table 300 may include multiple data entry columns 302a-302p and multiple data entries (e.g., 304a, 304b).

The data entry columns 302a-302p may include a trailer identifier 302a, a shipping status 302b, an order destination 302c, an order arrival location 302d, a shipping client 302e, an ultimate order destination 302f, a pick up number 302g, a reference number 302h, a temporary indication 302i, a grounded indication 302j, a current location 302k, an assigned driver 302l, an assigned indication 302m, a prioritization level 302n, a trailer size 302o, and a notes section 302p. As an example, a logistics server (e.g., logistics server(s) 102) may receive from an order data source order data corresponding to an order that includes a trailer number, a shipping status indicating that the unit is "Received", an order arrival location, and an ultimate order destination. In this example, the logistics server(s) 102 may populate the respective data entry columns (e.g., 302a, 302b, 302d, and 302o) of the example order data table 300 with the received order data, and/or may apply a dispatch learning model (e.g., dispatch learning model 108) to the received order data in order to determine a driver logistics prediction value and/or a driver determination.

As further examples, the data entries 304a, 304b include multiple data entries in respective data entry columns 302a-302p. More specifically data entry 304a includes a trailer identifier (EMHU 649023), a shipping status (Received), an order destination (Schiller), an order arrival location (NSCAL), a shipping client (NS), an ultimate order destination (Lachine), a pick up number (3411), an assigned driver (e.g., driver 204), and a prioritization level (4). Similarly, data entry 304*b* includes a trailer identifier (EMHU 644861), a shipping status (Received), an order destination (Centera), an order arrival location (G2), a shipping client (WATCO), an assigned driver (Vlad), and a prioritization level (4). However, unlike data entry 304*a*, data entry 304*b* does not include an ultimate order destination or a pick up number, and does include a reference number (750744), a note (MWATCO SLIDE). Thus, the order data received by the logistics server(s) 102 corresponding to a particular order may include some/all of the order data represented by the data entry columns 302*a*-302*p* and/or additional data types not represented in FIG. 3A. Moreover, as previously mentioned, the order data included as part of the data entries 304*a*, 304*b* may represent order data ingested by a dispatch learning model (e.g., dispatch learning model 108) in order to generate a driver logistics prediction value and/or a driver determination, as described herein.

As an example, and in reference to FIG. 2, the data entry 304*a* includes an order arrival location 302*d* corresponding to one of the markers 202*c* and an order destination 302*c* corresponding to one of the markers 202*g*. In this example, the driver 204 represents a driver who has a computing device (e.g., user computing device 112*c*1) executing the dispatch app 114 at the time the order arrival location 302*d* and the order destination 302*c* corresponding to the data entry 304*a* are received at a logistics server (e.g., logistics server 102). As described further herein, the dispatch learning model 108 ingests the order arrival location 302*d* and the order destination 302*c* corresponding to the data entry 304*a* as well as driver 204's current location (and other drivers, e.g., driver 206), as received from the dispatch app 114. The dispatch learning model 108 determines that driver 204 has the highest likelihood (e.g., percentage likelihood) of any active drivers to transport the unit (e.g., as described by the corresponding trailer identifier 302*a*) from the order arrival location 302*d* to the order destination 302*c* by and/or before a cut-off time. As a result, the logistics server 102 pushes a driver determination to driver 204's device for driver 204 to accept the order for transport. When driver 204 accepts the order, driver 204 is listed in the assigned driver 3021 data entry column for the data entry 304*a*.

Figure 3B:
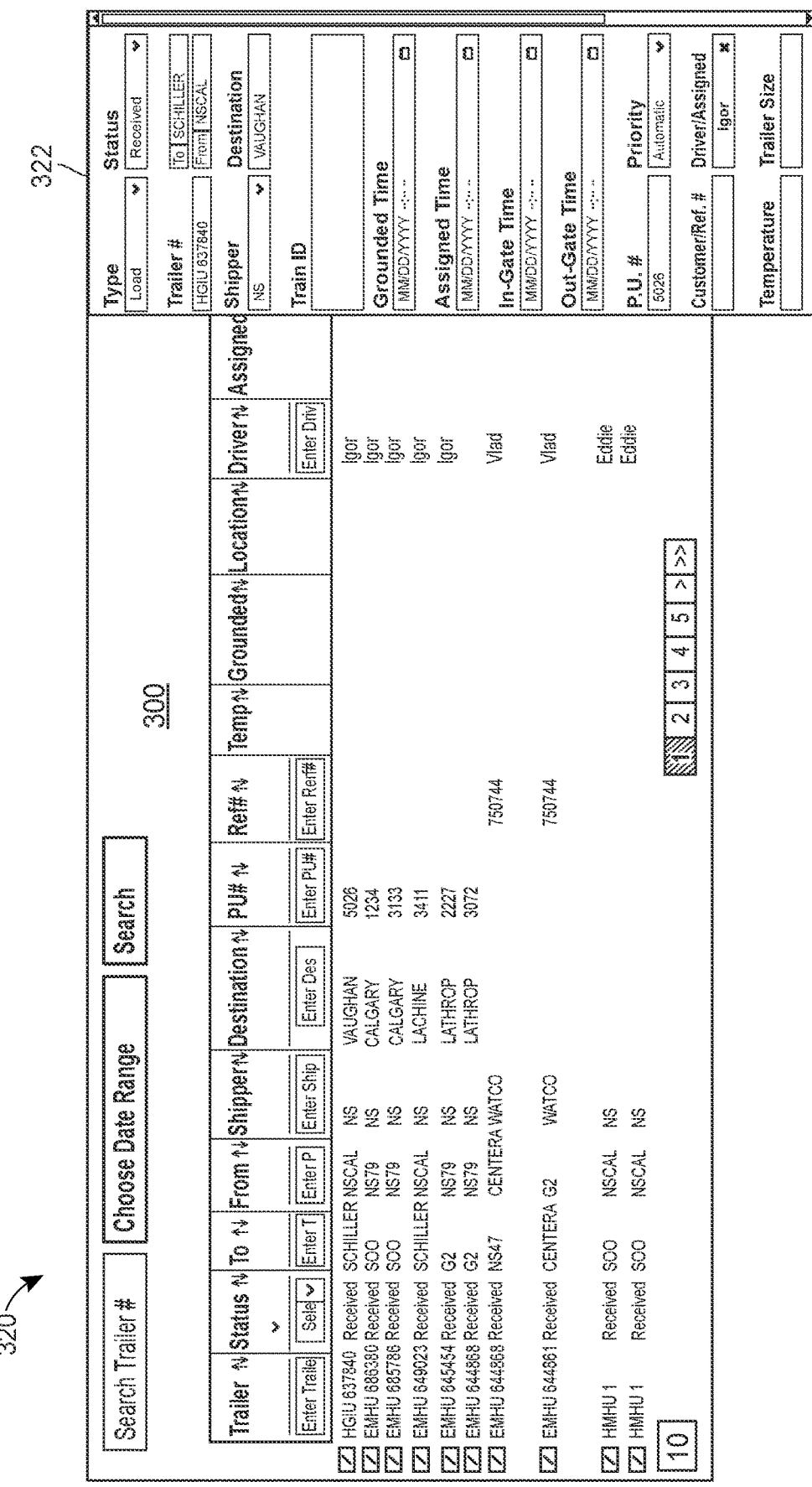
FIG. 3B illustrates an example user interface including the example order data table of FIG. 3A and an edit pane, in accordance with various aspects disclosed herein.

FIG. 3B illustrates an example user interface 320 including the example order data table 300 of FIG. 3A and an edit pane 322, in accordance with various aspects disclosed herein. More specifically, the example order data table 320 includes the example order data table 300 along with an example edit pane 322 configured to edit data entries included within the example order data table 300. For example, a logistics server (e.g., logistics server(s) 102) may receive order data corresponding to each of the orders included in the example order data table 300, and as a result, the server 102 may populate the example order data table 300 accordingly. In this example, an administrator or other user may subsequently receive a phone call or other communication indicating that order data corresponding to a particular order included in the example order data table 300 should be modified. Accordingly, the administrator or other user may access the example user interface 320, and may utilize the edit pane 322 to manually change one or more of the order data entries included in the example order data table 300.

Figure 4:
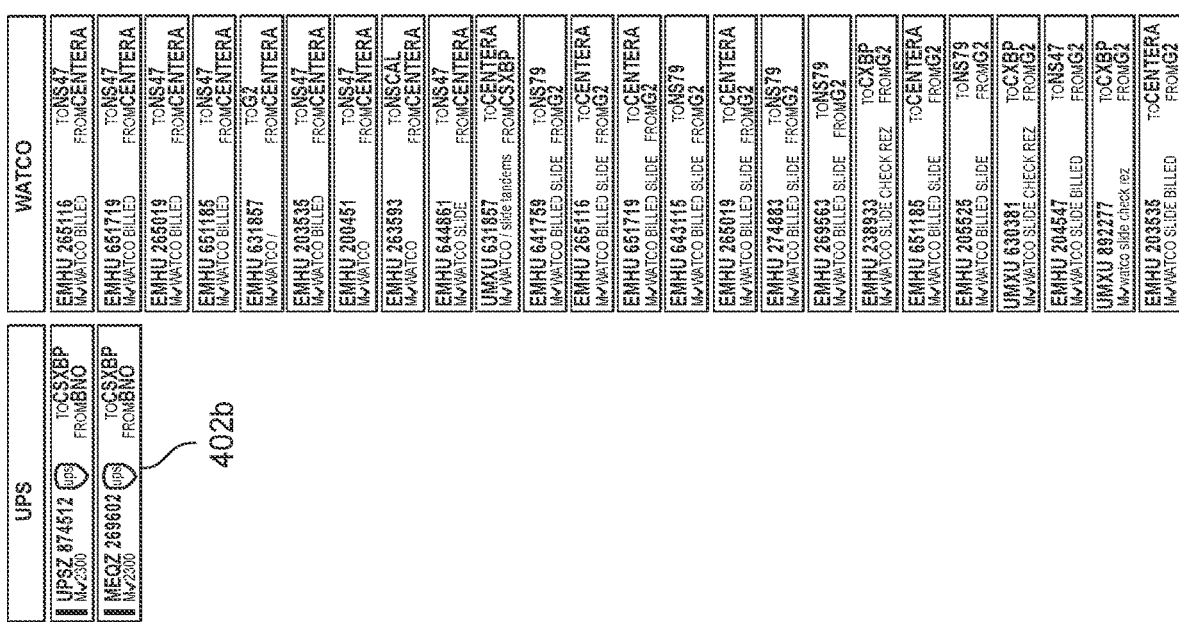
FIG. 4 illustrates another example order data table including prioritizations, in accordance with various aspects disclosed herein.

FIG. 4 illustrates another example order data table 400 including prioritizations, in accordance with various aspects disclosed herein. The example order data table 400 may generally display similar order data as the example order data table 300, but in a different display or GUI format. For example, the example order data table 400 may be optimally formatted for a desktop computer monitor and/or television, whereas the example order data table 300 may be optimally formatted for a mobile device (e.g., user computing devices 111*c*1, 112*c*1).

In any event, the example order data table 400 includes multiple order data entries (e.g., 402*a*, 402*b*, 402*c*), and the various entries may generally include different formatting/visual indications based on the corresponding order data. For example, the data entry 402*a* may represent an order from shipper MODE that is a normal priority order. By contrast, the data entry 402*b* may represent an order from the shipper UPS that is a high priority order, as indicated by the patterning on the left side of the data entry block. Moreover, the data entry 402*c* may represent an order from the shipper NS that is a normal priority order including hazardous materials, as indicated by the symbol in the middle of the data entry block. Thus, the data entries included as part of the example order data table 400 may include a variety of graphical renderings, symbols, illustrations, and/or other indications that provide a user with additional information regarding the particular data entry. In certain embodiments, the graphical renderings, symbols, illustrations, etc. may additionally or alternatively be included as part of the data entries provided in the example order data table 300.

FIG. 5A illustrates the edit pane 322 from the example user interface 320 of FIG. 3B that is associated with the dispatch learning model of FIG. 1, in accordance with various aspects disclosed herein. As previously mentioned, the edit pane 322 may be configured to edit data entries included within an order data table (e.g., example order data table 300). For example, the edit pane 322 may include options (e.g., drop-down menus, data entry fields, etc.) that allow a user to edit/modify some/all of the order data included within an order data table. Moreover, in certain aspects, the edit pane 322 and/or a comparable functionality may be integrated directly into an order data source and/or a web browser. This direct integration allows the user operating the logistics server (e.g., logistics server(s) 102) to quickly and efficiently modify order data stored on the logistics server(s) 102 based on order data received from one or more data sources.

Figure 5B:
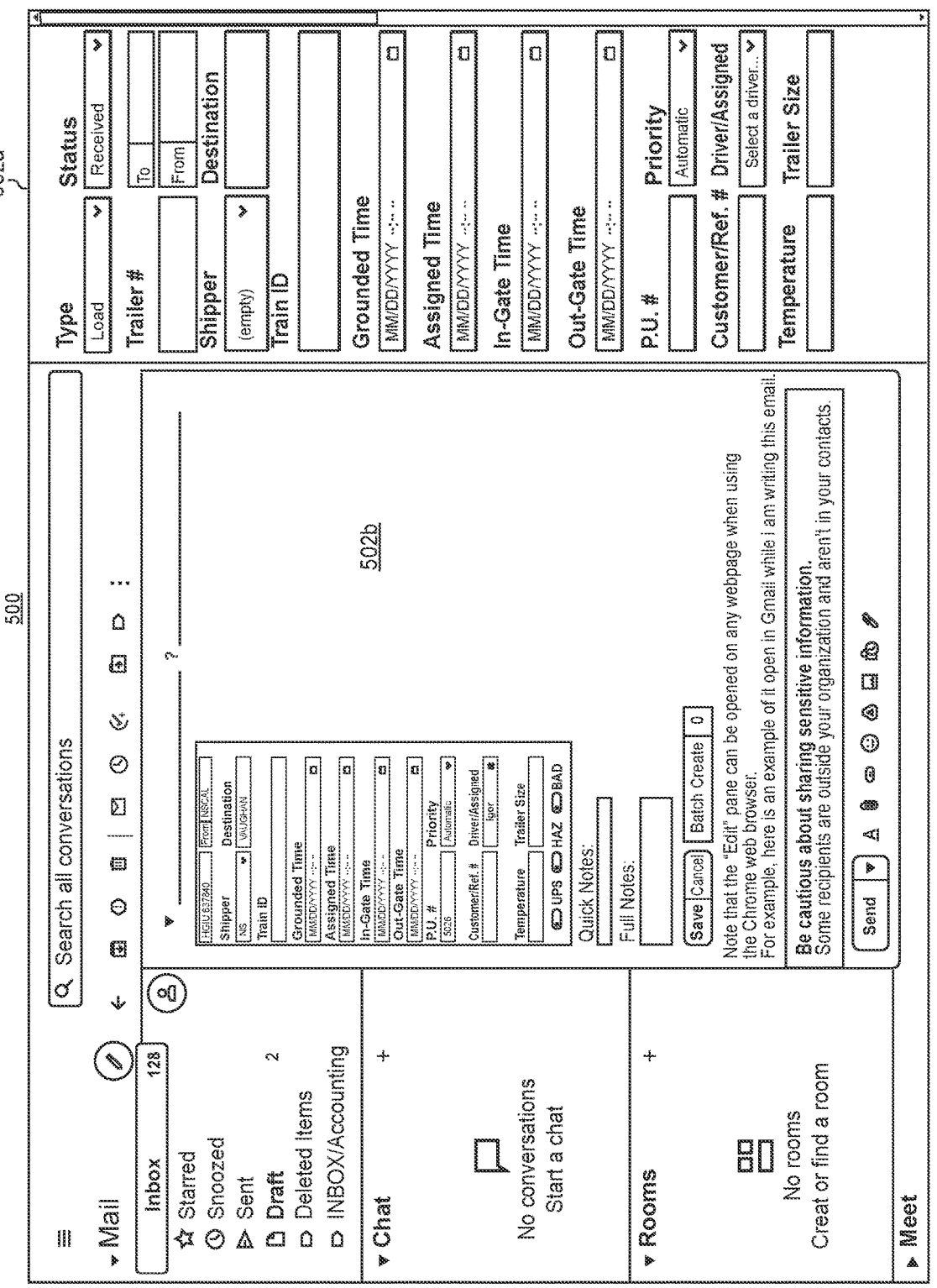
FIG. 5B illustrates an example user interface including an example edit pane within an email interface, in accordance with various aspects disclosed herein.
Figure 5C:
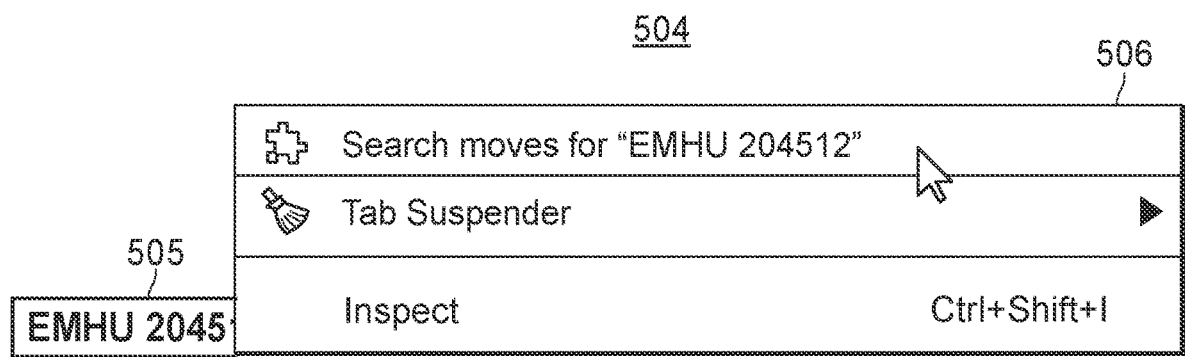
FIG. 5C illustrates an example menu interface allowing a user to query the example AI system of FIG. 1 for a unit number, in accordance with various aspects disclosed herein.

To illustrate, FIGS. 5B and 5C provide examples of such integrated functionality into a web browser and/or other suitable data source. FIG. 5B illustrates an example user interface 500 including an example edit pane 502*a* within an email interface 502*b*, in accordance with various aspects disclosed herein. As shown in FIG. 5B, a user may be composing an email within the email interface 502*b*, when the user recognizes/remembers that order data corresponding to an order should be changed/modified within the logistics server(s) 102. The user may open the example edit pane 502*a* from the email interface 502*b*, and may proceed to change/modify order data corresponding to the relevant order. Once the user saves the changes/modifications to the order data from the example edit pane 502*a*, the logistics server(s) 102 will automatically update the corresponding data entries for the order. Of course, the user may also decide to open the example edit pane 502*a* while browsing the Internet via a web browser and/or any other suitable action within the web browser and/or an order data source.

As another example, FIG. 5C illustrates an example menu interface 504 allowing a user to query the example AI system 100 of FIG. 1 for a unit number, in accordance with various aspects disclosed herein. In this example, a user may see a trailer number 505 (EMHU 20451) listed on a website (e.g., a railroad dashboard and/or other suitable data source, as described herein), and may desire to query the example AI system 100 for information regarding the trailer number 505. As illustrated in FIG. 5C, the user may highlight or otherwise select the trailer number 505, and may perform an action (e.g., right click using a connected mouse) to generate a drop down menu 506 with selectable options including a query option corresponding to querying the example AI system 100 for information related to the trailer number 505. Upon selection of the query option, the edit pane (e.g., edit pane 502a) may open/render on the user interface allowing the user to view and/or update information related to the trailer number 505. In this manner, the edit pane 502a, as part of the example AI system 100, may allow the user to access and update information stored in the logistics server(s) 102 regardless of the website the user is currently browsing.

Figure 6A:
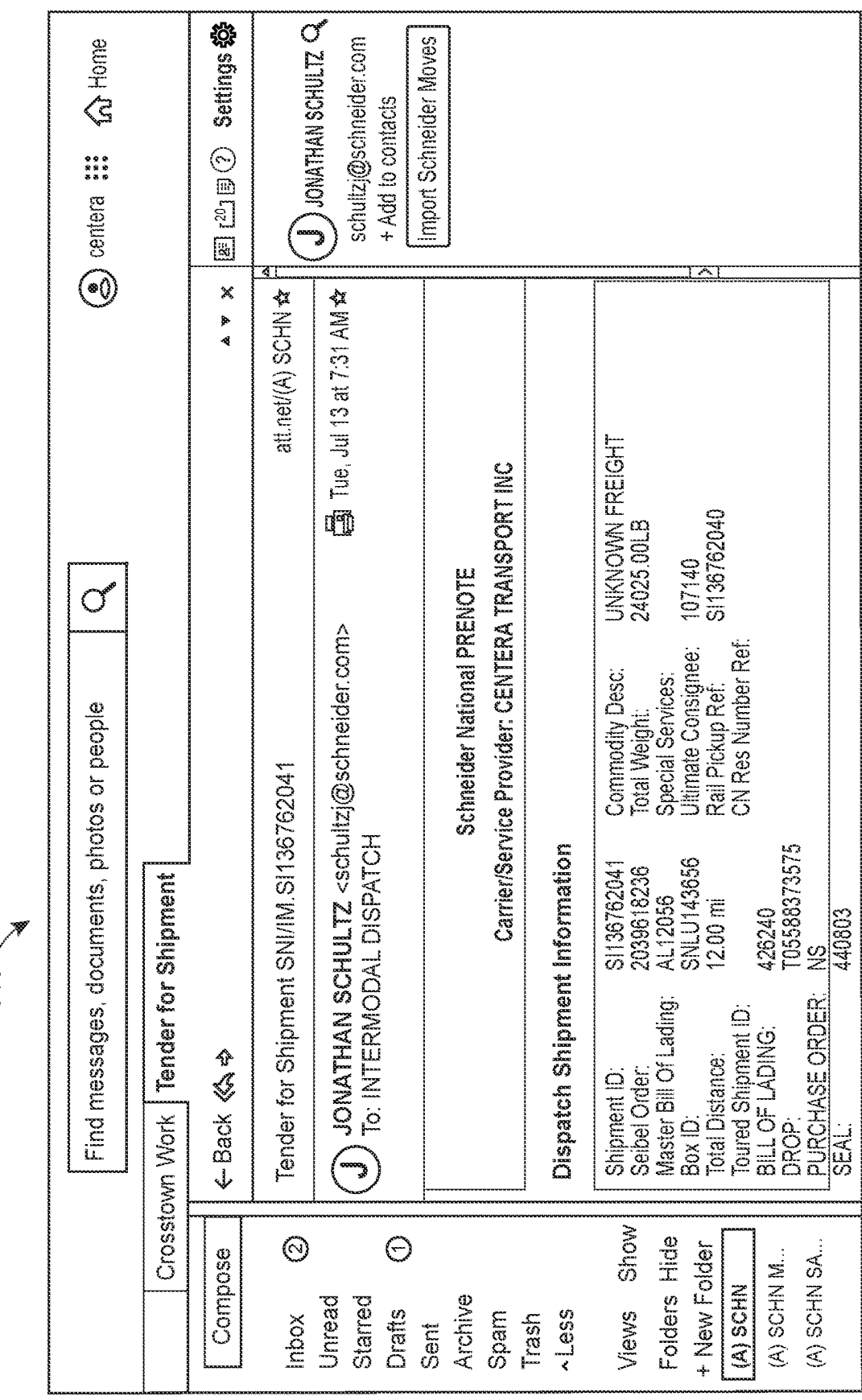
FIG. 6A illustrates an example user interface representative of an order data source that includes an integrated data acquisition panel, in accordance with various aspects disclosed herein.

In certain aspects, software components of the example AI system 100 of FIG. 1 may be integrated directly into the one or more data sources for automatic importing of order data. For example, FIG. 6A illustrates an example user interface 600 representative of an order data source 602a that includes an integrated data acquisition panel 602b, in accordance with various aspects disclosed herein. As illustrated in FIG. 6A, the order data source 602a may be an email interface wherein a user receives emails that include order data corresponding to orders. The integrated data acquisition panel 602b may include a data importing button 604 that a user may interact with (e.g., click, tap, etc.) in order to import data from the order data source 602a into a logistics server (e.g., logistics server(s) 102), where the imported data may be stored.

Figure 6B:
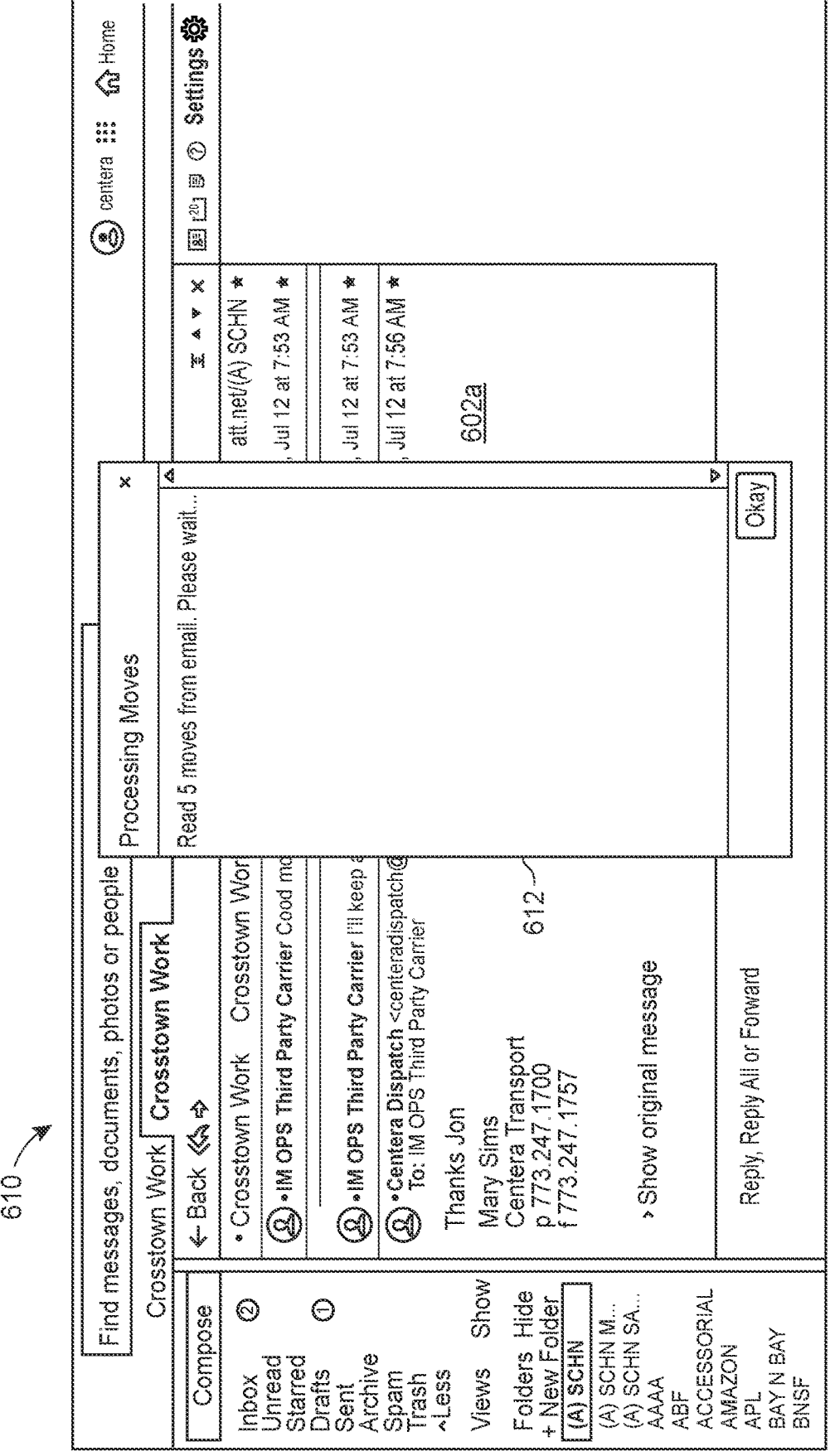
FIG. 6B illustrates another example user interface representative of an order data source that includes an active data processing panel, in accordance with various aspects disclosed herein.

More specifically, once the user interacts with the data importing button 604, the software of the logistics server(s) 102 may scan through all related messages in the order data source 602a, read each related message, extract all relevant order data, and add the relevant order data to storage within the logistics server(s) 102. For example, FIG. 6B, illustrates another example user interface 610 representative of the order data source 602a that includes an active data processing panel 612, in accordance with various aspects disclosed herein. As illustrated in FIG. 6B, the active data processing panel 612 may appear as part of the example user interface 610 after a user has interacted with the data importing button 604 of FIG. 6A. The software of the logistics server(s) 102 may read each message included within a common folder of the current message displayed on the order data source 602a, and may extract any relevant order data associated with a current order. Once the software has finished extracting the relevant order data from the messages included within the common folder (or if a user interacts with the "Okay" button of the panel 612), the active data processing panel 612 may disappear from the example user interface 610, and the user may proceed to access the logistics server(s) 102 to manage the newly added order data.

Figure 6C:
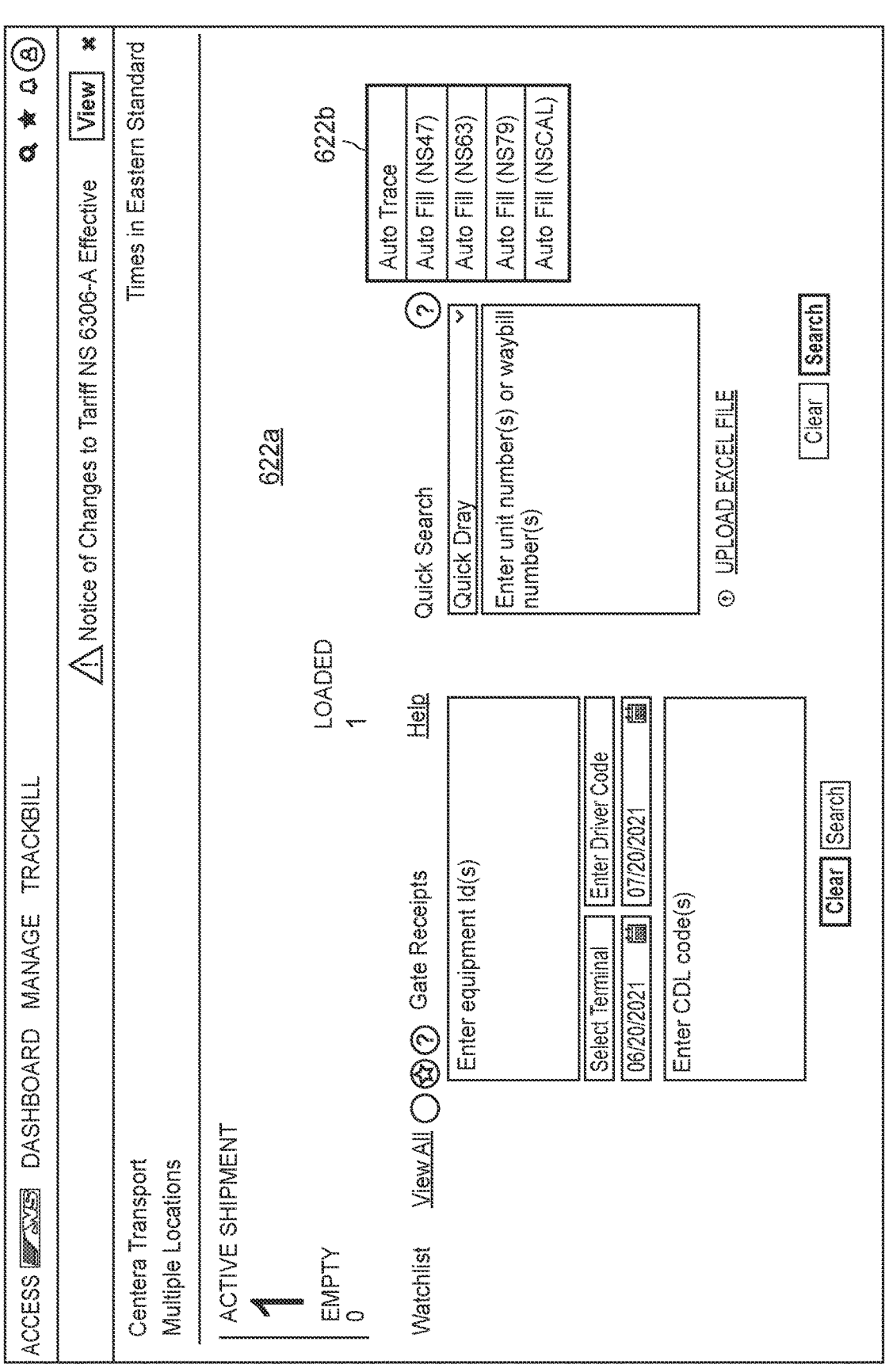
FIG. 6C illustrates yet another example user interface representative of an order data source including integrated data acquisition buttons configured to automatically update the example AI system of FIG. 1, in accordance with various aspects disclosed herein.

As another example, FIG. 6C illustrates yet another example user interface 620 representative of an order data source 622a including integrated data acquisition buttons 622b configured to automatically update the example AI system 100 of FIG. 1, in accordance with various aspects disclosed herein. In this example, the order data source 622a may be a portal website configured to allow users to track orders corresponding to a particular railroad. The integrated data acquisition buttons 622b may, for example, cause the software coupled with the logistics server(s) 102 to automatically search for orders set to arrive at a rail yard corresponding to the particular railroad, and may update the example AI system 100 (e.g., the logistics server(s) 102) with current statuses associated with one or more orders. The integrated data acquisition buttons 622b may also automatically fill in search queries within the order data source 622a to enable the user to manually search for order updates corresponding to orders currently stored/tracked by the logistics server(s) 102.

Thus, each of the above examples illustrate the efficient and automatic order data processing facilitated by the example AI system 100 of FIG. 1, and particularly the logistics server(s) 102 and corresponding stored software components. More specifically, the software coupled with the logistics server(s) 102 quickly and automatically scrapes and/or otherwise extracts order data from the order data source(s) as the order data is received, allowing a user to manage current orders without the need of manually updating/creating order statuses. Once the order data is received, the software components of the logistics server(s) 102 (e.g., the dispatch learning model 108) may proceed to generate driver logistics prediction values, and thereafter, driver determinations.

FIG. 7 illustrates an example method 700 for analyzing order data to generate a driver logistics prediction value, in accordance with various aspects disclosed herein. Method 700, and related flowchart of FIG. 7, represents an algorithm that may be implemented on one or more processors as described herein. The order data, as used with the method 700, and more generally as described herein, is data extracted from one or more order data sources (e.g., order data source(s) 116) and/or input by a user (e.g., by a website extension) and is received by a logistics server (e.g., logistics server(s) 102). For ease of discussion, the actions described herein with respect to the example method 700 may be performed by any suitable device/component described herein, such as the logistics server(s) 102, the order data source(s) 116, a user computing device 111c1-111c3 and 112c1-112c3, one or more processors (e.g., CPU 104), the dispatch learning model 108 as executed by one or more processors, and/or any combinations thereof.

The method 700 may include receiving, at one or more processors of a logistics server (e.g., logistics server(s) 102), order data from one or more order data sources (e.g., order data source(s) 116) corresponding to an order (block 702). In certain aspects, the order data is a plurality of dispatch intake forms in a plurality of formats. For example, the order data may be received by the logistics server(s) 102 within dispatch intake forms included within an email message, a faxed/scanned document, or the like. Accordingly, each of these dispatch intake forms may include different formatting styles, such that the order data included within each dispatch intake form may be organized/presented differently from other dispatch intake forms. As a result, the logistics server(s) 102 may extract, by the one or more processors (e.g., CPU 104), respective order data from each of the plurality of dispatch intake forms and thereafter standardize the respective order data into a universal format. In this manner, the logistics server(s) 102 may efficiently and accurately interpret order data received from each/any order data source(s) 116 by automatically standardizing the format of all received order data. Specifically, in these aspects, a dispatch learning model (e.g., dispatch learning model 108) may analyze each of the respective order data to generate a respective driver logistics prediction value for each of the respective order data, as described herein.

In some aspects, the one or more data sources includes at least one of (1) a website, (2) an email message, or (3) a spreadsheet (e.g., a MICROSOFT EXCEL spreadsheet). Moreover, the website may include a website extension (e.g., a GOOGLE CHROME extension) configured to communicate with the logistics server(s) 102 to transfer the order data from the website to the logistics server(s) 102. The website extension may be an executable file stored on the logistics server(s) 102 that is downloaded to a local device for execution. The website extension may be run locally on the local device and may allow a user to manually input updated order data into the logistics server(s) 102 in the event of issues arising with an order that may not update automatically (e.g., as illustrated in FIGS. 5A-5C). For example, a unit may be physically unmovable for a variety of reasons, and may therefore render the order incapable of completion. Additionally, or alternatively, a driver may be improperly included within the logistics server(s) 102 memory (e.g., memory 106) after quitting, etc., and may require manual removal from any current/scheduled orders. In these and other circumstances, a user may utilize the website extension to manually update the order data corresponding to a particular order.

In some aspects, the order data is a plurality of order data corresponding to a plurality of orders, and each respective order data includes a priority value (e.g., as illustrated in FIG. 4). In these aspects, one or more processors may generate a ranked list of the plurality of orders based on the priority value included in each respective order data. The ranked list may list/display the plurality of orders in order of highest priority to lowest priority, or any other suitable order. Moreover, in these aspects, the logistics server(s) 102 may receive from the one or more order data sources, a new order data corresponding to a new order, and the new order data may include a high priority value.

For example, the logistics server(s) 102 may receive a new order data indicating that the new order requires immediate shipment from the arrival location to the destination rail yard in order to make a cut-off time. The new order data may include a high priority value relative to the other pending orders currently monitored by the logistics server(s) 102. As a result, the logistics server(s) 102 may elevate the new order to a higher position on the ranked list, indicating that the new order may take priority (e.g., receive more prompt transport) over older orders listed in the ranked list. Thus, the logistics server(s) 102, by the one or more processors, may re-rank the ranked list of the plurality of orders based on the high priority value of the new order data.

The method 700 may optionally include determining an order status corresponding to the order based on the order data (optional block 704). The order status may be any suitable status, and may include, for example, an arrived status, a placed status, and a grounded status. The arrived status may indicate that the train or other transportation vehicle carrying the unit to the arrival location has arrived at the arrival location. The placed status may indicate that the unit is next in line, set up, and/or otherwise ready to be offloaded from the transportation vehicle, but is not yet ready to be picked up by a driver for cross-town transportation to the destination rail yard. The grounded status may indicate that the unit has been offloaded from the transportation vehicle, has been loaded onto a chassis or other suitable structure, and is ready for cross-town transportation to the destination rail yard. Specifically, in these aspects, responsive to determining that the order status indicates a grounded load the dispatch learning model (e.g., dispatch learning model 108) may analyze the order data to generate the driver logistics prediction value corresponding to the order data, as described herein.

The method 700 may also optionally include receiving, from a dispatch app (e.g., dispatch app 114), a respective location of each respective driver with a respective device executing the dispatch app (optional block 706). Namely, the logistics server(s) 102 may communicate with the dispatch app 114 executing on a driver's respective device using an API to retrieve location information corresponding to the driver. In certain aspects, the dispatch learning model 108 may be trained or provided with respective location information of respective drivers in order to output one or more driver logistics prediction values, as described herein. Additionally, the dispatch learning model 108 may analyze the order data and the respective location of each respective driver to generate the driver logistics prediction value corresponding to the order data and the respective location of each respective driver.

The method 700 may include analyzing, by a dispatch learning model (e.g., dispatch learning model 108) the order data to generate a driver logistics prediction value corresponding to the order data (block 708). Generally, the dispatch learning model 108 may be trained or provided with logistics data regarding order data of respective orders, and the dispatch learning model may be configured to output one or more driver logistics prediction values corresponding to the order data of the respective orders. The one or more driver logistics prediction values may generally indicate a fit/degree of confidence when relating the order data of a respective order and data associated with each respective driver that has the dispatch app 114 executing on a user computing device 111c1-111c3 and 112c1-112c3. Thus, if the data associated with a respective driver correlates highly with the order data of a respective order, then the dispatch learning model 108 may output a high driver logistics prediction value (e.g., a value of 80% or above) indicating that the respective driver is a good candidate to transport the respective order.

For example, and in reference to FIGS. 2 and 3A, a respective order may comprise a data entry 304a including an order arrival location 302d ("NSCAL") corresponding to one of the markers 202c and an order destination 302c ("SCHILLER") corresponding to one of the markers 202g. In this example, the dispatch learning model 108 receives these locations as well as the locations and current routes of drivers 204, 206 (e.g., driver 204 and driver 206, respectively). The dispatch learning model 108 determines, based on the current locations of the drivers 204, 206 an estimated time of arrival of each respective driver at the order arrival location 302d by using, for example, a mapping service that calculates an optimal route for each driver 204, 206 to the order arrival location 302d based on their respective current locations. Of course, the dispatch learning model 108 may also consider whether or not each driver 204, 206 currently has a scheduled delivery when calculating the estimated time of arrival. In any event, the dispatch learning model 108 determines which driver 204, 206 may most likely arrive at the order arrival location 302d first to thereby determine which driver 204, 206 has the highest likelihood (e.g., percentage likelihood) of transporting the unit from the order arrival location 302d to the order destination 302c before the cut-off time.

In this example, in some aspects, the driver 204 (driver 204) has no current delivery to complete, and the driver 206 has a current delivery to complete that has a destination location (e.g., marker 202*f*) in the opposite direction of the order arrival location 302*d*. driver 204 is currently closer to the order arrival location 302*d* and does not have any prior deliveries to complete, so the dispatch learning model 108 may determine that driver 204 has a better chance of reaching the order arrival location 302*d* before driver 206, and accordingly has a better chance of transporting the unit from the order arrival location 302*d* to the order destination 302*c* before the cut-off time. As a result, the dispatch learning model 108 outputs a relatively high driver logistics prediction value (e.g., 95% prediction value) corresponding to driver 204, and the model 108 may output a relatively low driver logistics prediction value (e.g., 60% prediction value) corresponding to driver 206.

Alternatively, in another aspect, at the time the dispatch learning model 108 analyzes the order data of the respective order and the data associated with the respective drivers 204, 206, driver 204 has a scheduled delivery to a destination location (e.g., marker 202*f*) in the opposite direction of the order arrival location 302*d* but driver 206 has no currently scheduled deliveries. In this circumstance, the dispatch learning model 108 may determine (e.g., receive a calculation from a mapping service) that, despite driver 204 being more proximate to the order arrival location 302*d* than driver 206, driver 206 has a higher likelihood (e.g., 90% likelihood) of arriving at the order arrival location 302*d* first to thereby transport the unit from the order arrival location 302*d* to the order destination 302*c* before the cut-off time. Thus, the dispatch learning model 108 can then output a relatively high driver logistics prediction value corresponding to driver 206, and the model 108 may output a relatively low driver logistics prediction value (e.g., 50% prediction value) corresponding to driver 204.

Generally, an AI based learning model (e.g., dispatch learning model 108) as referred to herein in various aspects, is trained or provided with logistics data regarding order data of respective orders. The dispatch learning model 108 is configured to, or is otherwise operable to, output one or more driver logistics prediction values corresponding to the order data of the respective orders. The logistics data comprises order data (e.g., arrival times/locations, departure times/locations, cut-off times, payment amounts, e.g., as described herein, for example, for FIGS. 2-6C) received from one or more order data sources (e.g., order data source(s) 116). Further, the logistics data used to train the dispatch learning model 108 may include location data corresponding to respective drivers who have a user computing device (e.g., user computing device 111*c*1-111*c*3 and 112*c*1-112*c*3) executing a dispatch application (e.g., dispatch app 114) that is connected to the logistics server(s) 102 where the model 108 may be stored. Of course, the logistics data may additionally include any suitable data such as allocation data associated with space allocation within a particular rail yard, break data associated with break times for respective drivers, and/or any other data or combinations thereof.

The dispatch learning model 108 may be trained using a supervised machine learning program or algorithm, such as a neural network. Generally, machine learning may involve identifying and recognizing patterns in existing data (such as generating driver logistics prediction values corresponding to the order data of respective orders) in order to facilitate making predictions or identification for subsequent data (such as using the model on new order data in order to determine or generate a driver logistics prediction value corresponding to the order data). Machine learning model(s), such as the dispatch learning model 108 described herein for some aspects, may be created and trained based upon example data (e.g., "logistics data") inputs or data (which may be termed "features" and "labels") in order to make valid and reliable predictions for new inputs, such as testing level or production level data or inputs.

In supervised machine learning, a machine learning program operating on a server, computing device, or otherwise processor(s), may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on the server, computing device, or otherwise processor(s), to predict, based on the discovered rules, relationships, or model, an expected output.

For example, and in reference to FIG. 3A, the dispatch learning model 108 may be trained using logistics data including the data entry 304*a*. The dispatch learning model 108 may receive the order arrival location 302*d* ("NSCAL") corresponding to one of the markers 202*c* of FIG. 2, and the order destination 302*c* ("SCHILLER") corresponding to one of the markers 202*g* as inputs from the data entry 304*a*. In combination with respective locations of active drivers (e.g., drivers 204, 206), the dispatch learning model 108 may output a driver logistics prediction value corresponding to the order arrival location 302*d*, the order destination 302*c*, and/or other order data comprising the data entry 304*a* or otherwise extracted from the corresponding order data source. This driver logistics prediction value may be used to update and/or otherwise inform the dispatch learning model 108, thereby improving the accuracy of subsequent driver logistics prediction values output by the model 108, for example, as the result of ingesting order data comprising the data entry 304*b*.

However, while described herein as being trained using a supervised learning technique (e.g., a neural network), in certain aspects, the dispatch learning model 108 may be trained using multiple supervised machine learning techniques, and may additionally or alternatively be trained using one or more unsupervised machine learning techniques. In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated.

For example, in certain aspects, the dispatch learning model 108 may employ a neural network, which may be a neural network, a deep learning neural network, or a combined learning module or program that learns in two or more features or feature datasets (e.g., order data) in particular areas of interest. The machine learning programs or algorithms may also include natural language processing, semantic analysis, automatic reasoning, support vector machine (SVM) analysis, decision tree analysis, random forest analysis, K-Nearest neighbor analysis, naïve Bayes analysis, clustering, reinforcement learning, and/or other machine learning algorithms and/or techniques. In some aspects, the artificial intelligence and/or machine learning based algorithms may be included as a library or package executed on the logistics server(s) 102. For example, libraries may include the TENSORFLOW based library, the PYTORCH library, and/or the SCIKIT-LEARN Python library. Regardless, training the dispatch learning model 108 may also comprise retraining, relearning, or otherwise updating models with new, or different, information, which may include information received, ingested, generated, or otherwise used over time.

In certain aspects, the dispatch learning model 108 may be a rules-based algorithm, a regression-based algorithm, and/or any other suitable algorithm configured to generate the driver logistics prediction value. Moreover, in these aspects, the driver logistics prediction value may be a time to delivery for each respective driver that represents the total time it may take each respective driver to deliver the unit from their respective current location. The model 108 may examine each driver currently utilizing the dispatch app to determine in real-time their respective time to deliver for each shipment that is currently ready for pickup. In these aspects, the model 108 may generally include determining each respective driver's current location, determining each respective driver's driving time from their current location to the pickup location, determining a time to pick up the shipment (e.g., enter the yard, get the container, and leave the yard), and determining a driving time from the pickup location to the drop off location.

Still in reference to the prior aspects, the model 108 may determine driving times using map data and traffic data to estimate how long the drive to the pickup yard and/or from the pickup yard to the drop off location may take. As previously mentioned, the model 108 may utilize an external service such as GOOGLE MAPS and/or any other suitable service. Thereafter, the model 108 may determine the time to pick up the shipment by, for example, using GPS data to track when drivers arrive at a yard to pick up a shipment and when they leave the yard after picking up the shipment. The model 108 may create and maintain a historical record of these pick up yard arrival/departure events, including the yard designation (e.g., yard name, owner/operator, etc.), the day of the week, the time of day, and/or any other suitable data. Accordingly, the model 108 may estimate the time required to enter and leave shipment yards (e.g., ingate/outgate times) based on this historical data to influence the overall driving time. It should be understood that this ingate/outgate estimation may be performed by the model 108 and/or any other independent algorithm utilizing any of the techniques described herein, such as ML, a regression-based algorithm, a rules-based algorithm, and/or any other suitable technique or combinations thereof.

Further in reference to the prior aspects, the model 108 may analyze several pieces of data to determine a respective driver's time to delivery. For example, if a respective driver is currently in route to deliver a first shipment, the model 108 may first calculate the time to delivery for the first shipment, and then use the drop off yard where the respective driver delivered the first shipment to as the starting location for calculating the time to delivery for a second shipment. The model 108 may then add the time to delivery corresponding to the first shipment to the time to delivery total for the second shipment. In any event, once the model 108 determines the time to delivery for each respective driver, the model 108 may also determine which respective driver may deliver the shipment in the lowest amount of time.

Moreover, still in reference to the prior aspects, when the model 108 determines the total time to delivery for a respective driver, the model 108 may also analyze one or more additional pieces of data to determine whether or not a respective driver will be able to transport the shipment. For example, the model 108 may analyze whether or not (i) the respective driver needs to refuel their truck before the delivery is complete, (ii) the respective driver may need to take a break during the transportation of the shipment, (iii) the respective driver may need to stop driving during the transportation of the shipment, (iv) the shipment contains hazardous materials, (v) the trailer is over or under 28 feet long, and/or any other suitable additional data.

The model 108 may determine whether or not the respective driver needs to refuel their truck before the delivery is complete by evaluating the total miles needed to drive to the delivery (plus the total miles to the nearest location they can get fuel after the delivery), along with the current fuel of the vehicle, and the average miles per gallon (MPG) of the vehicle. If the model 108 determines that the respective driver does not have enough fuel to complete the delivery, the model 108 may additionally determine how long it may take the respective driver to get more fuel. The model 108 may accomplish this by, for example, selecting the nearest location the respective driver may refuel, determining how long it will take the respective driver to drive there and how long it will take them to refuel, and how long it will take to drive to the starting location from the refueling location. In certain instances, the model 108 may not know how long it takes to refuel once the respective driver arrives at the refueling location, so the model 108 may create/maintain a record similar to the historical record previously mentioned above to track timings for different locations (e.g., the historical model used to determine how long it may take to pick up a shipment). Accordingly, the model 108 may estimate the time required to refuel a vehicle based on this historical data to influence the overall driving time. It should be understood that this refueling estimation may be performed by the model 108 and/or any other independent algorithm utilizing any of the techniques described herein, such as ML, a regression-based algorithm, a rules-based algorithm, and/or any other suitable technique or combinations thereof.

Further, in many instances, drivers may be legally required to take breaks at certain intervals. The model 108 may determine whether or not the respective driver needs to take a break during the transportation of the shipment by adding the additional break time to the time to delivery. For example, if the time to delivery estimate is 1 hour, and the respective driver needs to take a legally required 30 minute break before that hour is complete, the model 108 may add 30 minutes to the time to delivery estimate. Similarly, in many instances, drivers may be legally required to stop driving after a certain number of consecutive hours. The model 108 may also factor this in to the time to delivery, such that if the respective driver will be required to stop working before the time to delivery estimate, the respective driver will be disqualified from picking up the shipment. As referenced herein, a driver may be "disqualified" from delivering a shipment by receiving a driver logistics prediction value that is below a threshold value (e.g., a time to delivery exceeding an acceptable time threshold), not receiving a driver determination through the dispatch app, and/or otherwise eliminated from consideration by the model 108 from delivering the shipment.

Another factor the model 108 may analyze to determine an accurate time to delivery for each respective driver is whether or not the shipment contains hazardous materials, and/or otherwise requires specific driving credentials (e.g., qualified to deliver tankers). Not all drivers may be qualified to deliver shipments with hazardous materials, and as such, the model 108 may determine whether or not the shipment includes hazardous materials, and whether or not each respective driver is qualified to transport such hazardous materials. In the event that a shipment contains hazardous materials and a respective driver is not qualified to deliver hazardous materials, the model 108 may disqualify the respective driver from picking up the shipment. Additionally, or alternatively, the model 108 may consider whether or not the trailer being transported is a 28-foot trailer. Generally speaking, 28-foot trailers, also known as "pups", can only be delivered by certain drivers driving certain vehicles (e.g., "tractors"). Thus, the model 108 may determine whether or not the trailer is 28 feet long, whether a respective driver is qualified to deliver such trailers, whether the vehicle is configured to fit such a trailer, and if a respective driver is not qualified to deliver such trailers, the model 108 may disqualify the respective driver from delivering the shipment.

As previously mentioned, in some aspects, the model 108 may also include shipment prioritizations when generating the driver logistics prediction value. Certain shipments may take priority over other shipments, and in certain aspects, a respective driver may be assigned to deliver a high priority shipment instead of a shipment that the respective driver could have delivered in a faster overall time. For example, the model 108 may analyze certain factors, such as which customer is requesting the shipment, how long shipments have been grounded, and/or other factors in order to determine a shipment priority ordering/ranking before determining respective drivers to deliver each shipment. Once the model 108 determines the shipment priority ordering/ranking, the model 108 may proceed to sequentially assign drivers to the shipments in order of priority, as previously described.

It is to be understood that model 108 may operate in conjunction with additional or different computing instructions, such that, in at least in some embodiments, computer instructions separate from the model may provide data to, and receive information from, the model 108 in order for operation, including any of the operations as described herein.

The method 700 may also include generating by the one or more processors 104 a driver determination that identifies a driver to fulfill the order based on the driver logistics prediction value (block 710). Generally, the driver determination may include a description of the order for presentation to a driver chosen to fulfill the order based on the output of the dispatch learning model 108. In certain aspects, the driver determination may include at least a portion of the order data, such as the arrival time/location, departure time/location, cut-off time, payment amount, and the like.

The logistics server(s) 102 may execute the dispatch learning model 108 and generate the driver determination based on the highest driver logistics prediction value output by the dispatch learning model 108. For example, assume that the dispatch learning model 108 outputs three driver logistics prediction values corresponding to three different drivers—driver A, driver B, and driver C. In this example, further assume that the driver logistics prediction value for driver A is 90 out of 100, the driver logistics prediction value for driver B is 75 out of 100, and the driver logistics prediction value for driver C is 25 out of 100. Of course, the driver logistics prediction value may be expressed in any suitable manner, such as a percentage, numerical score, alphanumeric character, and/or any combinations thereof. In any event, in the above example, the logistics server(s) 102 may analyze each of the driver logistics prediction values to determine that driver A should be chosen to fulfill the order because driver A has the highest driver logistics prediction value of the three drivers considered.

As a result, the logistics server(s) 102 may then push, by the one or more processors 104, the driver determination to the dispatch application 114 executing on the user computing device of the driver (block 712). Responsive to receiving the driver determination, the dispatch app 114 may display a graphical user interface (GUI) depicting the driver determination. For example, and in reference to FIG. 3A, the unit number (e.g., trailer identifier 302a), the cut-off time, any relevant notes (e.g., notes section 302p), and/or other suitable information may be rendered on the display screen of the user computing device in real-time or near-real time, during, or after receiving, the order data corresponding to the order. If the driver accepts the order represented by the driver determination, then the logistics server 102 may assign the driver to the order (e.g., driver 204 listed in the assigned driver 3021 data entry column of data entry 304a).

Figure 8A:
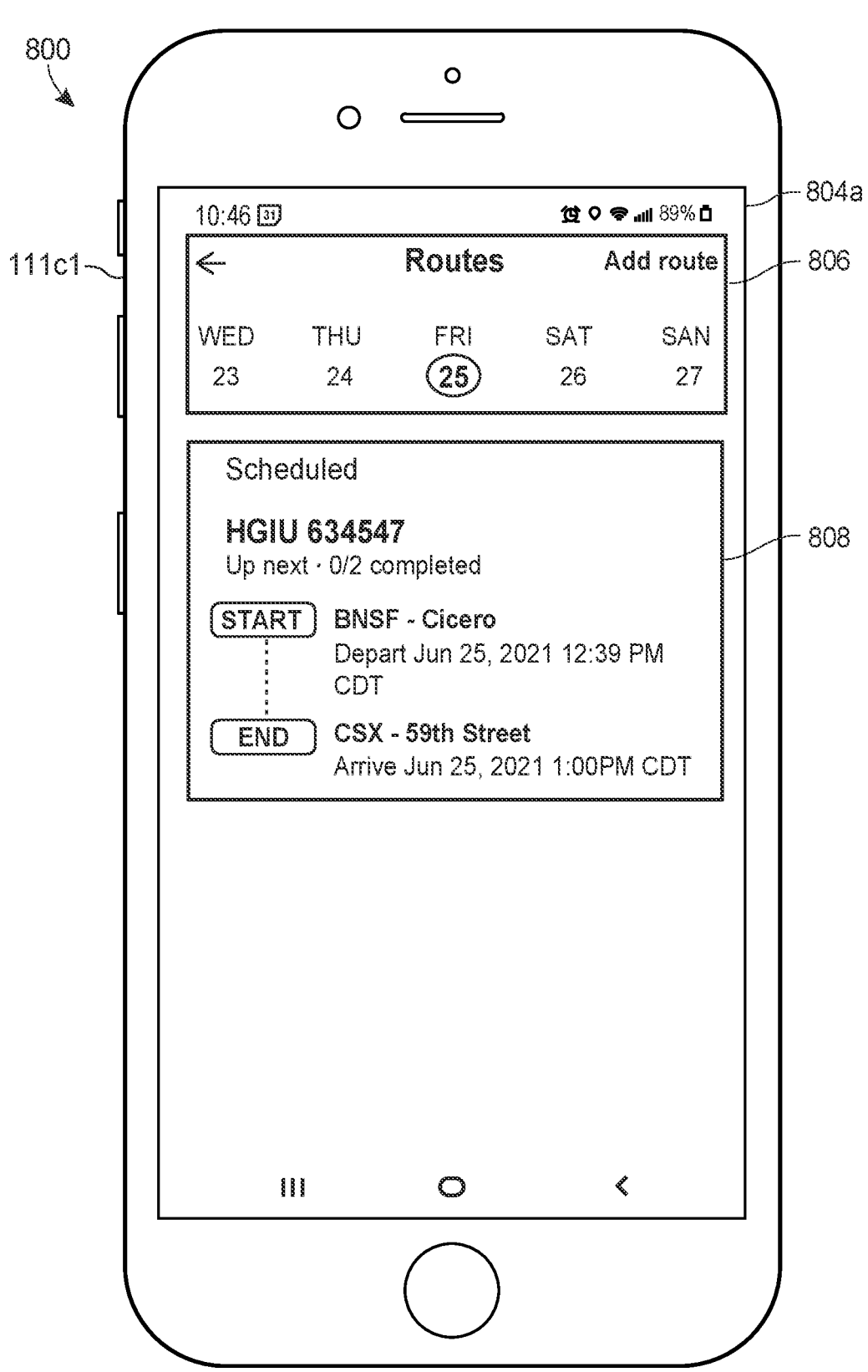
FIG. 8A illustrates an example user interface as rendered on a display screen of a user computing device, in accordance with various aspects disclosed herein.

As an example, FIG. 8A illustrates an example user interface 804a as rendered on a display screen 800 of a user computing device (e.g., user computing device 111c1) in accordance with various aspects disclosed herein. Such an example user interface 804a may be rendered when a driver accepts an order, and thereby commits to fulfilling the order. Generally, when the driver accepts the order, the dispatch app 114 may transmit an updated order status back to the logistics server(s) 102 indicating that the order is "assigned". Further, when the driver has successfully delivered the order, the dispatch app 114 may transmit another updated order status back to the logistics server(s) 102 indicating that the order is "completed". In this manner, when a user accessing the logistics server(s) 102 observes that an order is indicated as "completed," the user may proceed with suitable billing procedures to receive compensation from the shipper.

In any event, as shown in the example of FIG. 8A, the user interface 804a may be implemented or rendered via an application (app) executing on user computing device 111c1, such as the dispatch app 114. In the example of FIG. 8A, user computing device 111c1 is a user computing device as described for FIG. 1, e.g., where 111c1 is illustrated as an APPLE iPhone that implements the APPLE iOS operating system and that has display screen 800. User computing device 111c1 may execute one or more native applications (apps) on its operating system, including, for example, the dispatch app 114, as described herein. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, user interface 804a may be implemented or rendered via a web interface, such as via a web browser application, e.g., SAFARI and/or GOOGLE CHROME app(s), or other such web browser or the like.

As shown in the example of FIG. 8A, user interface 804a comprises a graphical representation of a portion of the driver determination, including a header section 806 and a scheduled order section 808. The header section 806 may generally include a title ("Routes") corresponding to the data displayed in the scheduled order section 808, and may also include a data selection bar allowing the user to adjust the date and thereby view scheduled trips on the associated selected date. The scheduled order section 808 may generally display orders accepted by the driver that have been pushed from the logistics server(s) 102 to the user computing device 111c1. Accordingly, the dispatch app 114 may directly convey a driver determination to a driver by rendering data included as part of the driver determination to the driver on the user interface 804a when the driver accepts the order corresponding to the driver determination. In certain aspects, the dispatch app 114 may render the user interface 804a first in a series of graphical displays intended to provide the driver with a comprehensive overview of the accepted order defined by the driver determination pushed to the user computing device 111c1.

Figure 8B:
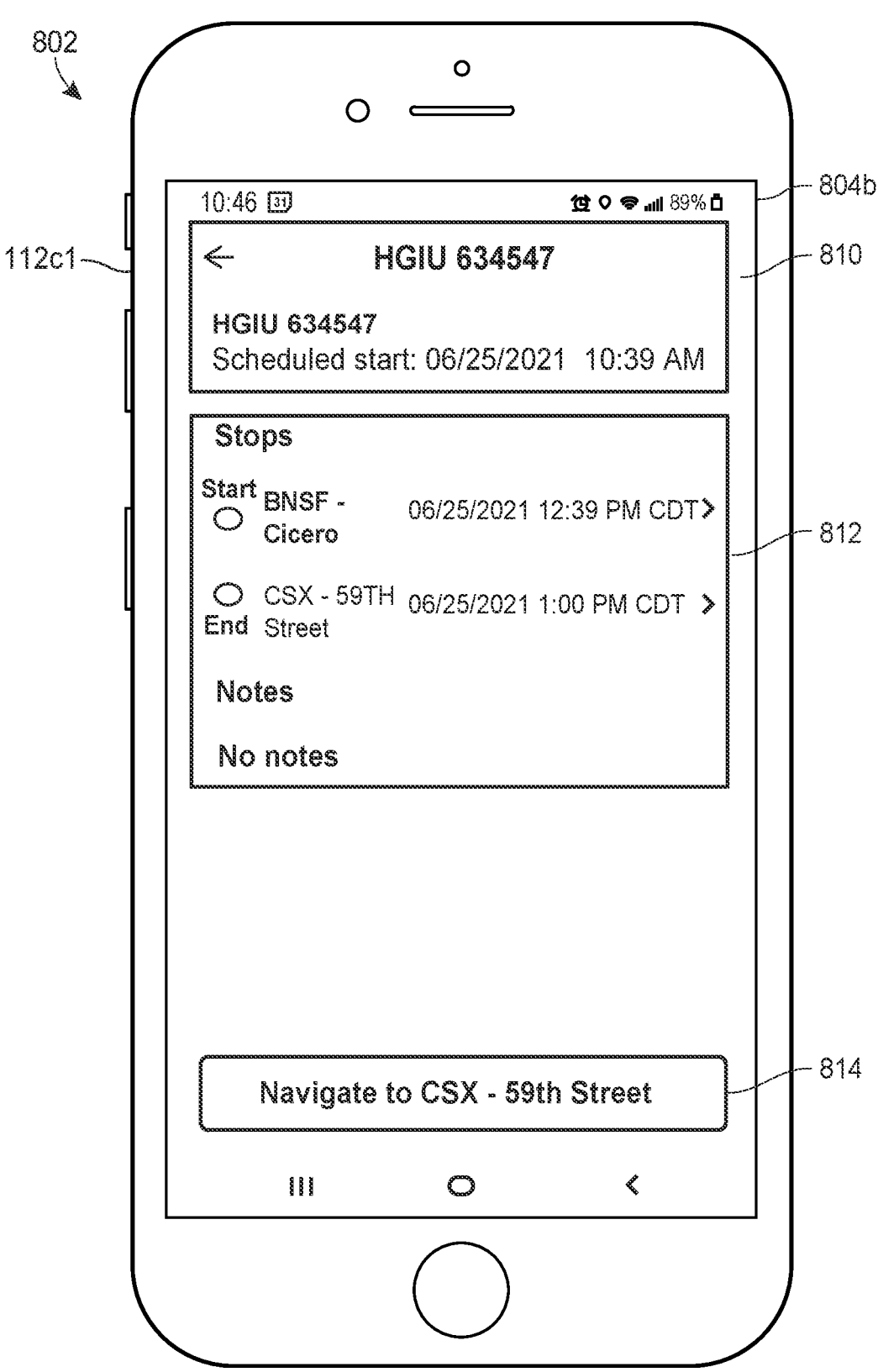
FIG. 8B illustrates another example user interface as rendered on a display screen of a user computing device, in accordance with various aspects disclosed herein.

For example, FIG. 8B illustrates another example user interface 804b as rendered on a display screen 802 of a user computing device (e.g., user computing device 112c1), and in certain aspects, the user interface 804b may be a subsequent graphical rendering to the user interface 804a of FIG. 8A. The user interface 804b comprises a graphical representation of another portion of the driver determination pushed from the logistics server(s) 102 to the user computing device 112c1, including an order header section 810, an order travel details section 812, and a selectable navigation button 814. The order header section 810 generally includes high-level details corresponding to an order accepted by the driver, such as order/unit number and a scheduled start date/time. The order travel details section 812 generally includes travel details corresponding to the order accepted by the driver, such as a starting location (e.g., the arrival location of the unit), an ending location (e.g., the destination location of the unit), and a notes section that may include special instructions from the shipper.

The selectable navigation button 814 automatically provides navigation instructions to enable the driver to travel from the starting location to the ending location. For example, when a driver selects (e.g., by tapping, clicking, etc.) the selectable navigation button 814, the dispatch app 114 may automatically render an additional graphical display (similar to the example map 200 of FIG. 2) that presents the driver with a route from the starting location to the ending location. The dispatch app 114 may also provide the driver with text-based instructions describing the route from the starting location to the ending location. The route presented to the driver may be optimized (e.g., by a mapping service) such that the travel time from the starting location to the ending location is minimized to increase the likelihood that the driver successfully delivers the unit prior to the scheduled cut-off time.

In some aspects, any graphical representations with graphical annotations and/or textual annotations may be rendered (e.g., rendered locally on display screen 800, 802) in real-time or near-real time during or after receiving an acceptance from the driver of an order corresponding to a driver determination pushed to the driver's computing device (e.g., user computing device 111c1, 112c1). Moreover, in certain aspects, the driver logistics prediction value and the driver determination may be generated/determined and transmitted in real-time or near real-time by the logistics server(s) 102 when the order data is received by the logistics server(s) 102.

Of course, it is to be understood that other rendering types or values are contemplated herein, such as color values used and/or overlaid on a graphical representation (e.g., color values representing priorities of accepted orders) and/or numerical values displayed with the graphical representation (e.g., raw scores, absolute scores, percentage based scores, and/or any other scores representing priorities of accepted orders) shown on the user interface 804a, 804b. Additionally, or alternatively, such colors, scores, and/or other renderings may be presented with textual or graphical indicators indicating whether or not a colors, score, etc. is representative of high priority orders, low priority orders, or other relevant conditions corresponding to an order (e.g., hazardous materials symbol).

Moreover, it is to be understood that any of the graphical/textual renderings present on user interfaces 804a, 804b may be rendered on either of user interfaces 804a, 804b. For example, the selectable navigation button 814 present in the user interface 804b may be rendered as part of the display in user interface 804a. Similarly, some/all of the header section 806 of user interface 804a may be rendered as part of the display in user interface 804b.

Aspects of the Disclosure

The following aspects are provided as examples in accordance with the disclosure herein and are not intended to limit the scope of the disclosure.

1. An artificial intelligence (AI) based system configured to analyze order data to generate a driver logistics prediction value, the system comprising: a logistics server configured to ingest order data from one or more order data sources, the logistics server comprising computing instructions configured to execute on one or more processors of the logistics server, wherein the logistics server is communicatively coupled to a dispatch application (app); and a dispatch learning model, accessible by the logistics server, and trained or provided with logistics data regarding order data of respective orders, the dispatch learning model configured to output one or more driver logistics prediction values corresponding to the order data of the respective orders, wherein the computing instructions, when executed by the one or more processors of the logistics server, cause the one or more processors of the logistics server to: receive, by the logistics server, order data from the one or more order data sources corresponding to an order, analyze, by the dispatch learning model, the order data to generate a driver logistics prediction value corresponding to the order data, generate, based on the driver logistics prediction value, a driver determination that identifies a driver to fulfill the order, and push, by the logistics server, the driver determination to the dispatch app of the driver, and wherein, responsive to receiving the driver determination, the computing instructions cause the dispatch app to display a graphical user interface (GUI) including the driver determination.

2. The AI based system of aspect 1, wherein the dispatch learning model is further trained or provided with respective location data of respective drivers, and the computing instructions further cause the one or more processors of the logistics server to: receive, from the dispatch app, a respective location of each respective driver with a respective device executing the dispatch app, and analyze, by the dispatch learning model, the order data and the respective location of each respective driver to generate the driver logistics prediction value corresponding to the order data and the respective location of each respective driver.

3. The AI based system of any one of aspects 1-2, wherein the computing instructions further cause the one or more processors of the logistics server to: determine an order status corresponding to the order based on the order data, and responsive to determining that the order status indicates a grounded load, analyze, by the dispatch learning model, the order data to generate the driver logistics prediction value corresponding to the order data.

4. The AI based system of any one of aspects 1-3, wherein the order data is a plurality of dispatch intake forms in a plurality of formats, and the computing instructions further cause the one or more processors of the logistics server to: extract respective order data from each of the plurality of dispatch intake forms, standardize the respective order data into a universal format, and analyze, by the dispatch learning model, each of the respective order data to generate a respective driver logistics prediction value for each of the respective order data.

5. The AI based system of any one of aspects 1-4, wherein the driver determination includes at least a portion of the order data.

6. The AI based system of any one of aspects 1-5, wherein the one or more data sources includes at least one of (1) a website, (2) an email message, or (3) a spreadsheet.

7. The AI based system of aspect 6, wherein the web site includes a website extension configured to communicate with the logistics server to transfer the order data from the website to the logistics server.

8. The AI based system of any one of aspects 1-7, wherein the order data is a plurality of order data corresponding to a plurality of orders, each respective order data includes a priority value, and the computing instructions further cause the one or more processors of the logistics server to: generate a ranked list of the plurality of orders based on the priority value included in each respective order data, receive, from the one or more order data sources, a new order data corresponding to a new order, the new order data including a high priority value, and re-rank the ranked list of the plurality of orders based on the high priority value of the new order data.

9. An artificial intelligence (AI) based method for analyzing order data to generate a driver logistics prediction value, the method comprising: receiving, at one or more processors of a logistics server, order data from one or more order data sources corresponding to an order; analyzing, by a dispatch learning model, the order data to generate a driver logistics prediction value corresponding to the order data, wherein the dispatch learning model is trained or provided with logistics data regarding order data of respective orders, and the dispatch learning model is configured to output one or more driver logistics prediction values corresponding to the order data of the respective orders; generating, by the one or more processors, a driver determination that identifies a driver to fulfill the order based on the driver logistics prediction value; and pushing, by the one or more processors, the driver determination to a dispatch application (app) of the driver, wherein, responsive to receiving the driver determination, the dispatch app displays a graphical user interface (GUI) depicting the driver determination.

10. The AI based method of aspect 9, wherein the dispatch learning model is further trained or provided with respective location data of respective drivers, and the method further comprises: receiving, from the dispatch app, a respective location of each respective driver with a respective device executing the dispatch app; and analyzing, by the dispatch learning model, the order data and the respective location of each respective driver to generate the driver logistics prediction value corresponding to the order data and the respective location of each respective driver.

11. The AI based method of any one of aspects 9-10, further comprising: determining, by the one or more processors, an order status corresponding to the order based on the order data; and responsive to determining that the order status indicates a grounded load, analyzing, by the dispatch learning model, the order data to generate the driver logistics prediction value corresponding to the order data.

12. The AI based method of any one of aspects 9-11, wherein the order data is a plurality of dispatch intake forms in a plurality of formats, and the method further comprises: extracting, by the one or more processors, respective order data from each of the plurality of dispatch intake forms; standardizing, by the one or more processors, the respective order data into a universal format; and analyzing, by the dispatch learning model, each of the respective order data to generate a respective driver logistics prediction value for each of the respective order data.

13. The AI based method of any one of aspects 9-12, wherein the driver determination includes at least a portion of the order data.

14. The AI based method of any one of aspects 9-13, wherein the one or more data sources includes at least one of (1) a website, (2) an email message, or (3) a spreadsheet.

15. The AI based method of aspect 14, wherein the website includes a website extension configured to communicate with the logistics server to transfer the order data from the website to the logistics server.

16. The AI based method of any one of aspects 9-15, wherein the order data is a plurality of order data corresponding to a plurality of orders, each respective order data includes a priority value, and the method further comprises: generating, by the one or more processors, a ranked list of the plurality of orders based on the priority value included in each respective order data; receiving, from the one or more order data sources, a new order data corresponding to a new order, the new order data including a high priority value; and re-ranking, by the one or more processors, the ranked list of the plurality of orders based on the high priority value of the new order data.

17. A tangible, non-transitory computer-readable medium storing instructions for analyzing order data to generate a driver logistics prediction value, that when executed by one or more processors cause the one or more processors to: receive order data from one or more order data sources corresponding to an order; analyze, by a dispatch learning model, the order data to generate a driver logistics prediction value corresponding to the order data, wherein the dispatch learning model is trained or provided with logistics data regarding order data of respective orders, and the dispatch learning model is configured to output one or more driver logistics prediction values corresponding to the order data of the respective orders; generate a driver determination that identifies a driver to fulfill the order based on the driver logistics prediction value; and push the driver determination to a dispatch application (app) of the driver, wherein, responsive to receiving the driver determination, the dispatch app displays a graphical user interface (GUI) depicting the driver determination.

18. The tangible, non-transitory computer-readable medium of aspect 17, wherein the dispatch learning model is further trained or provided with respective location data of respective drivers, and the instructions further cause the one or more processors to: receive, from the dispatch app, a respective location of each respective driver with a respective device executing the dispatch app; and analyze, by the dispatch learning model, the order data and the respective location of each respective driver to generate the driver logistics prediction value corresponding to the order data and the respective location of each respective driver.

19. The tangible, non-transitory computer-readable medium of any one of aspects 17-18, wherein the instructions further cause the one or more processors to: determine an order status corresponding to the order based on the order data; and responsive to determining that the order status indicates a grounded load, analyze, by the dispatch learning model, the order data to generate the driver logistics prediction value corresponding to the order data.

20. The tangible, non-transitory computer-readable medium of any one of aspects 17-19, wherein the order data is a plurality of dispatch intake forms in a plurality of formats, and the instructions further cause the one or more processors to: extract respective order data from each of the plurality of dispatch intake forms; standardize the respective order data into a universal format; and analyze, by the dispatch learning model, each of the respective order data to generate a respective driver logistics prediction value for each of the respective order data.

Additional Considerations

Although the disclosure herein sets forth a detailed description of numerous different aspects, it should be understood that the legal scope of the description is defined by the words of the claims set forth at the end of this patent and equivalents. The detailed description is to be construed as exemplary only and does not describe every possible aspect since describing every possible aspect would be impractical. Numerous alternative aspects may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain aspects are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example aspects, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example aspects, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example aspects, the processor or processors may be located in a single location, while in other aspects the processors may be distributed across a number of locations.

The performance of certain of the operations may be distributed among the one or more processors, not only residing within a single machine, but deployed across a number of machines. In some example aspects, the one or more processors or processor-implemented modules may be located in a single geographic location (e.g., within a home environment, an office environment, or a server farm). In other aspects, the one or more processors or processor-implemented modules may be distributed across a number of geographic locations.

This detailed description is to be construed as exemplary only and does not describe every possible aspect, as describing every possible aspect would be impractical, if not impossible. A person of ordinary skill in the art may implement numerous alternate aspects, using either current technology or technology developed after the filing date of this application.

Those of ordinary skill in the art will recognize that a wide variety of modifications, alterations, and combinations can be made with respect to the above described aspects without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. An artificial intelligence (AI) based system configured to analyze order data to generate a driver logistics prediction value, the system comprising:

a logistics server configured to ingest a set of order data from one or more order data sources, the logistics server comprising computing instructions configured to execute on one or more processors of the logistics server, wherein the logistics server is communicatively coupled to a dispatch application (app); and a dispatch learning model, accessible by the logistics server, that is trained using (i) logistics data regarding thousands of instances of training order data of respective orders including in-gate times and outgate times associated with one or more locations, (ii) respective location data of respective drivers, (iii) respective delivery routes of respective drivers, and (iv) a plurality of formats of the training order data, (v) driver details for a plurality of drivers including at least one of: (a) a driver location or (b) a driver credential value, and (vi) driver vehicle details associated with the plurality of drivers including at least one of: (a) a fuel level or (b) a fuel consumption rate to accurately predict the driver logistics prediction value, the dispatch learning model being trained to output (a) one or more driver logistics prediction values corresponding to the training order data of the respective orders and (b) the training order data in a universal format wherein the dispatch learning model has at least one of: (i) a depth value associated with layers of the dispatch learning model or (ii) a width value associated with nodes in the layers of the dispatch learning model, the depth value and the width value being configured to decrease machine resources of the logistics server consumed during execution of the dispatch learning model, wherein the dispatch learning model decreases computational resources by reducing at least one of the depth value or the width value dimensionality requirement of machine resources of the logistics server, thereby freeing up computational resources of the logistics server, wherein the computing instructions, when executed by the one or more processors of the logistics server, cause the one or more processors of the logistics server to:

receive, by the logistics server, a dispatch intake form in a first format from the one or more order data sources corresponding to an order, wherein the first format is related to a transmission method used by a respective order data source of the one or more order data sources that submitted the dispatch intake form to the logistics server, extract, using a character recognition routine, order data from the dispatch intake form, wherein the order data includes a pick-up yard, a destination location, an order status, and a priority value, standardize, by the dispatch learning model, the order data from the first format into the universal format, receive, from the dispatch app, (i) a respective location, (ii) a respective delivery route of each respective driver with a respective device executing the dispatch app, and (iii) a delivery status of the driver, analyze, by the dispatch learning model, (i) the order data in the universal format, (ii) historical in-gate times associated with the pick-up yard that are stored in a historical record that includes in-gate times and outgate times associated with one or more locations, (iii) historical outgate times associated with the pick-up yard that are stored in the historical record, (iv) the respective location of each respective driver, and (v) the respective delivery routes of each respective driver to:

generate, via a mapping service and for each respective driver based on the respective locations, the delivery status, and the respective delivery routes of the respective drivers, an optimal route configured to minimize time required for each driver to complete their respective delivery routes and travel to the pick-up yard, and generate a driver logistics prediction value corresponding to the order data based on a first optimal route for a driver of the respective drivers, the first optimal route having a minimal total time for the driver to arrive at the pick-up yard relative to other optimal routes generated via the mapping service wherein the dispatch learning model generates the optimal route by calculating estimated arrival times based on the historical in-gate times and the historical outgate times stored in the historical record, thereby reducing computational iterations required to determine driver assignments, generate, based on the driver logistics prediction value, a driver determination that identifies the driver to fulfill the order, push, by the logistics server, the driver determination to the dispatch app of the driver, and wherein, responsive to receiving the driver determination, the computing instructions cause the dispatch app to display a first graphical user interface (GUI) including the driver determination, receive a first updated order status from the dispatch app of the driver indicating that the order is assigned to the driver, and update the dispatch learning model using the driver logistics prediction value to improve the accuracy of a subsequent driver logistics prediction value output by the dispatch learning model.

2. The AI based system of claim 1, wherein the computing instructions further cause the one or more processors of the logistics server to:

determine an order status corresponding to the order based on the order data, and responsive to determining that the order status indicates a grounded load, analyze, by the dispatch learning model, the order data to generate the driver logistics prediction value corresponding to the order data.

3. The AI based system of claim 1, wherein the order data is included in a plurality of dispatch intake forms in a plurality of formats, and the computing instructions further cause the one or more processors of the logistics server to:

extract respective order data from each of the plurality of dispatch intake forms, standardize the respective order data into the universal format, and analyze, by the dispatch learning model, each of the respective order data to generate a respective driver logistics prediction value for each of the respective order data.

4. The AI based system of claim 1, wherein the driver determination includes at least a portion of the order data.

5. The AI based system of claim 1, wherein the one or more order data sources includes at least one of (1) a website, (2) an email message, or (3) a spreadsheet.

6. The AI based system of claim 5, wherein the one or more order data sources includes the website, and the website includes a website extension configured to communicate with the logistics server to transfer the order data from the website to the logistics server.

7. The AI based system of claim 1, wherein the order data is a plurality of order data corresponding to a plurality of orders, each respective order data includes a priority value, and the computing instructions further cause the one or more processors of the logistics server to:

generate a ranked list of the plurality of orders based on the priority value included in each respective order data, receive, from the one or more order data sources, a new order data corresponding to a new order, the new order data including a high priority value, and re-rank the ranked list of the plurality of orders based on the high priority value of the new order data.

8. The AI based system of claim 1, wherein the computing instructions further cause the one or more processors of the logistics server to:

receive (i) the dispatch intake form in the first format from the one or more order data sources, (ii) driver details for a plurality of drivers including at least one of: (a) a driver location or (b) a driver credential value, and (iii) driver vehicle details associated with the plurality of drivers including at least one of: (a) a fuel level or (b) a fuel consumption rate; and analyze, by the dispatch learning model, (i) the order data in the universal format, (ii) the driver details, and (iii) the driver vehicle details to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details.

9. The AI based system of claim 1, wherein both the pick-up yard and the destination location are railway terminals, and the computing instructions further cause the one or more processors of the logistics server to:

determine an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieve, by accessing a plurality of dispatch applications (apps) of a plurality of drivers via an application programming interface (API), location information corresponding to a plurality of drivers;

responsive to determining that the order status indicates a grounded load, analyze, by the dispatch learning model, (i) the order data in the universal format and (ii) the location information to generate the driver logistics prediction value corresponding to the order data;

push the driver determination to a respective dispatch app of the driver, wherein, responsive to receiving the driver determination, the respective dispatch app displays the first GUI depicting the driver determination; and responsive to the driver accepting the order via the driver determination, receive the updated order status from the respective dispatch app of the driver indicating that the order is assigned to the driver.

10. The AI based system of claim 1, wherein the computing instructions further cause the one or more processors of the logistics server to:

receive (i) the dispatch intake form in the first format from the one or more order data sources, (ii) driver details for a plurality of drivers including at least one of: (a) a driver location or (b) a driver credential value, and (iii) driver vehicle details associated with the plurality of drivers including at least one of: (a) a fuel level or (b) a fuel consumption rate;

extract, by executing the character recognition routine, the order data from the dispatch intake form, wherein both the pick-up yard and the destination location are railway terminals;

determine an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieve, by accessing a plurality of dispatch applications (apps) of a plurality of drivers via an application programming interface (API), location information corresponding to a plurality of drivers;

analyze, by the dispatch learning model, (i) the order data in the universal format, (ii) the driver details, (iii) the driver vehicle details, and (iv) the location information to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details;

push the driver determination to a respective dispatch app of the driver, wherein, responsive to receiving the driver determination, the respective dispatch app displays the first GUI depicting the driver determination; and responsive to the driver accepting the order via the driver determination, receive the updated order status from the respective dispatch app of the driver indicating that the order is assigned to the driver.

11. The AI based system of claim 1, wherein the driver proceeds to deliver the order using the optimal route.

12. The AI based system of claim 11, wherein the computing instructions further cause the one or more processors of the logistics server to:

receive a second updated order status from the dispatch app of the driver indicating a completion of the order by the driver.

13. The AI based system of claim 1, wherein the driver delivers the order before a cut-off time to prevent a corresponding delay.

14. The AI based system of claim 1, wherein the computing instructions further cause the one or more processors of the logistics server to:

cause the dispatch app of the driver to display a second GUI including a first portion of the driver determination, the first portion comprising a scheduled order section that displays accepted orders of the driver on a particular date including the order, track (i) an in-gate time of the driver arriving at the pick-up yard on the particular date and (ii) an outgate time of the driver departing the pick-up yard, include (i) the in-gate time of the driver arriving at the pick-up yard on the particular date and (ii) the outgate time as entries in the historical record to maintain the historical record, cause the dispatch app of the driver to display a third GUI including a second portion of the driver determination, the second portion comprising an order travel details section and a selectable navigation button, the order travel details section indicating the pick-up yard of the order and the destination location of the order, and responsive to receiving a selection indication of the selectable navigation button from the driver, causing the dispatch app of the driver to render a graphical display of a second optimal route associated with the driver to provide the driver with travel instructions from the pick-up yard to the destination location.

15. An artificial intelligence (AI) based method for analyzing order data to generate a driver logistics prediction value, the method comprising:

receiving, at one or more processors of a logistics server, a dispatch intake form in a first format from one or more order data sources corresponding to an order, wherein the first format is related to a transmission method used by a respective order data source of the one or more order data sources that submitted the dispatch intake form to the logistics server;

extracting, by the one or more processors executing a character recognition routine, order data from the dispatch intake form, wherein the order data includes a pick-up yard, a destination location, an order status, and a priority value;

standardizing, by the one or more processors executing a dispatch learning model, the order data from the first format into a universal format;

receiving, from a dispatch application (app) communicatively coupled to the logistics server, (i) a respective location, (ii) a respective delivery route of each respective driver with a respective device executing the dispatch app, (iii) a delivery status of the driver;

analyzing, by the one or more processors executing the dispatch learning model, (i) the order data in the universal format, (ii) historical in-gate times associated with the pick-up yard that are stored in a historical record that includes in-gate times and outgate times associated with one or more locations, (iii) historical outgate times associated with the pick-up yard that are stored in the historical record, (iv) the respective location of each respective driver, and (v) the respective delivery routes of each respective driver to:

generate, via a mapping service and for each respective driver based on the respective locations, the delivery status, and the respective delivery routes of the respective drivers, an optimal route configured to minimize time required for each driver to complete their respective delivery routes and travel to the pick-up yard, and generate a driver logistics prediction value corresponding to the order data based on a first optimal route for a driver of the respective drivers, the first optimal route having a minimal total time for the driver to arrive at the pick-up yard relative to other optimal routes generated via the mapping service wherein the dispatch learning model generates the optimal route by calculating estimated arrival times based on the historical in-gate times and the historical outgate times stored in the historical record, thereby reducing computational iterations required to determine driver assignments, wherein the dispatch learning model is trained using (i) logistics data regarding thousands of instances of training order data of respective orders including in-gate times and outgate times associated with one or more locations, (ii) respective location data of respective drivers, (iii) respective delivery routes of respective drivers, (iv) a plurality of formats of the training order data, (v) driver details for a plurality of drivers including at least one of: (a) a driver location or (b) a driver credential value, and (vi) driver vehicle details associated with the plurality of drivers including at least one of: (a) a fuel level or (b) a fuel consumption rate to accurately predict the driver logistics prediction value, the dispatch learning model being trained to output (a) one or more driver logistics prediction values corresponding to the training order data of the respective orders and (b) the training order data in the universal format wherein the dispatch learning model has at least one of: (i) a depth value associated with layers of the dispatch learning model or (ii) a width value associated with nodes in the layers of the dispatch learning model, the depth value and the width value being configured to decrease machine resources of the logistics server consumed during execution of the dispatch learning model, wherein the dispatch learning model decreases computational resources by reducing at least one of the depth value or the width value dimensionality requirement of machine resources of the logistics server, thereby freeing up computational resources of the logistics server;

generating, by the one or more processors, a driver determination that identifies the driver to fulfill the order based on the driver logistics prediction value;

pushing, by the one or more processors, the driver determination to the dispatch of the driver, wherein, responsive to receiving the driver determination, the dispatch app displays a first graphical user interface (GUI) depicting the driver determination;

receiving, at the one or more processors, an updated order status from the dispatch app of the driver indicating that the order is assigned to the driver; and updating, by the one or more processors, the dispatch learning model using the driver logistics prediction value to improve the accuracy of a subsequent driver logistics prediction value output by the dispatch learning model.

16. The AI based method of claim 15, further comprising:

determining, by the one or more processors, an order status corresponding to the order based on the order data; and responsive to determining that the order status indicates a grounded load, analyzing, by the dispatch learning model, the order data to generate the driver logistics prediction value corresponding to the order data.

17. The AI based method of claim 15, wherein the order data is a plurality of dispatch intake forms in a plurality of formats, and the method further comprises:

extracting, by the one or more processors, respective order data from each of the plurality of dispatch intake forms;

standardizing, by the one or more processors, the respective order data into the universal format; and analyzing, by the dispatch learning model, each of the respective order data to generate a respective driver logistics prediction value for each of the respective order data.

18. The AI based method of claim 15, wherein the driver determination includes at least a portion of the order data.

19. The AI based method of claim 15, wherein the one or more order data sources includes at least one of (1) a website, (2) an email message, or (3) a spreadsheet.

20. The AI based method of claim 19, wherein the one or more order data sources includes the website, and the website includes a website extension configured to communicate with the logistics server to transfer the order data from the website to the logistics server.

21. The AI based method of claim 15, wherein the order data is a plurality of order data corresponding to a plurality of orders, each respective order data includes a priority value, and the method further comprises:

generating, by the one or more processors, a ranked list of the plurality of orders based on the priority value included in each respective order data;

receiving, from the one or more order data sources, a new order data corresponding to a new order, the new order data including a high priority value; and re-ranking, by the one or more processors, the ranked list of the plurality of orders based on the high priority value of the new order data.

22. The AI based method of claim 15, further comprising:

receiving, at the one or more processors, (i) the dispatch intake form in the first format from the one or more order data sources, (ii) driver details for a plurality of drivers including at least one of: (a) a driver location or (b) a driver credential value, and (iii) driver vehicle details associated with the plurality of drivers including at least one of: (a) a fuel level or (b) a fuel consumption rate; and analyzing, by the dispatch learning model, (i) the order data in the universal format, (ii) the driver details, and (iii) the driver vehicle details to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details.

23. The AI based method of claim 15, wherein both the pick-up yard and the destination location are railway terminals, and the method further comprises:

determining, by the one or more processors, an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieving, by the one or more processors accessing a plurality of dispatch applications (apps) of a plurality of drivers via an application programming interface (API), location information corresponding to a plurality of drivers;

responsive to determining that the order status indicates a grounded load, analyzing, by the dispatch learning model, (i) the order data in the universal format and (ii) the location information to generate the driver logistics prediction value corresponding to the order data;

pushing, by the one or more processors, the driver determination to a respective dispatch app of the driver, wherein, responsive to receiving the driver determination, the respective dispatch app displays the graphical user interface (GUI) depicting the driver determination; and responsive to the driver accepting the order via the driver determination, receiving, at the one or more processors, the updated order status from the respective dispatch app of the driver indicating that the order is assigned to the driver.

24. The AI based method of claim 15, further comprising:

receiving, at the one or more processors, (i) the dispatch intake form in the first format from the one or more order data sources, (ii) driver details for a plurality of drivers including at least one of: (a) a driver location or (b) a driver credential value, and (iii) driver vehicle details associated with the plurality of drivers including at least one of: (a) a fuel level or (b) a fuel consumption rate;

extracting, by the one or more processors executing the character recognition routine, the order data from the dispatch intake form, wherein both the pick-up yard and the destination location are railway terminals;

determining, by the one or more processors, an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieving, by the one or more processors accessing a plurality of dispatch applications (apps) of a plurality of drivers via an application programming interface (API), location information corresponding to a plurality of drivers;

analyzing, by the dispatch learning model, (i) the order data in the universal format, (ii) the driver details, (iii) the driver vehicle details, and (iv) the location information to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details;

pushing, by the one or more processors, the driver determination to a respective dispatch app of the driver, wherein, responsive to receiving the driver determination, the respective dispatch app displays the graphical user interface (GUI) depicting the driver determination; and responsive to the driver accepting the order via the driver determination, receiving, at the one or more processors, the updated order status from the respective dispatch app of the driver indicating that the order is assigned to the driver.

25. The AI based method of claim 15, further comprising:

updating, by the one or more processors, the dispatch learning model using the driver logistics prediction value to improve the accuracy of a subsequent driver logistics prediction value output by the dispatch learning model.

26. The AI based method of claim 15, wherein the driver proceeds to deliver the order using the optimal route.

27. The AI based method of claim 26, further comprising:

receiving, by the one or more processors, a second updated order status from the dispatch app of the driver indicating a completion of the order by the driver.

28. The AI based method of claim 15, wherein the driver delivers the order before a cut-off time to prevent a corresponding delay.

29. The AI based method of claim 15, further comprising:

causing, by the one or more processors, the dispatch app of the driver to display a second GUI including a first portion of the driver determination, the first portion comprising a scheduled order section that displays accepted orders of the driver on a particular date including the order, tracking, by the one or more processors, (i) an in-gate time of the driver arriving at the pick-up yard on the particular date and (ii) an outgate time of the driver departing the pick-up yard, including, by the one or more processors, (i) the in-gate time of the driver arriving at the pick-up yard on the particular date and (ii) the outgate time as entries in the historical record to maintain the historical record, causing, by the one or more processors, the dispatch app of the driver to display a third GUI including a second portion of the driver determination, the second portion comprising an order travel details section and a selectable navigation button, the order travel details section indicating the pick-up yard of the order and the destination location of the order, and responsive to receiving a selection indication of the selectable navigation button from the driver, causing, by the one or more processors, the dispatch app of the driver to render a graphical display of a second optimal route associated with the driver to provide the driver with travel instructions from the pick-up yard to the destination location.

30. A tangible, non-transitory computer-readable medium storing instructions for analyzing order data to generate a driver logistics prediction value, that when executed by one or more processors cause the one or more processors to:

receive a dispatch intake form in a first format from one or more order data sources corresponding to an order, wherein the first format is related to a transmission method used by a respective order data source of the one or more order data sources that submitted the dispatch intake form to a logistics server;

extract, using a character recognition routine, order data from the dispatch intake form, wherein the order data includes a pick-up yard, a destination location, an order status, and a priority value;

standardize, by a dispatch learning model, the order data from the first format into a universal format;

receive, from a dispatch application (app) communicatively coupled to the logistics server, (i) a respective location, (ii) a respective delivery route of each respective driver with a respective device executing the dispatch app, (iii) a delivery status of the driver;

analyze, by the dispatch learning model, (i) the order data in the universal format, (ii) historical in-gate times associated with the pick-up yard that are stored in a historical record that includes in-gate times and outgate times associated with one or more locations, (iii) historical outgate times associated with the pick-up yard that are stored in the historical record, (iv) the respective location of each respective driver, and (v) the respective delivery routes of each respective driver to:

generate, via a mapping service and for each respective driver based on the respective locations, the delivery status, and the respective delivery routes of the respective drivers, an optimal route configured to minimize time required for each driver to complete their respective delivery routes and travel to the pick-up yard, and generate a driver logistics prediction value corresponding to the order data based on a first optimal route for a driver of the respective drivers, the first optimal route having a minimal total time for the driver to arrive at the pick-up yard relative to other optimal routes generated via the mapping service wherein the dispatch learning model generates the optimal route by calculating estimated arrival times based on the historical in-gate times and the historical outgate times stored in the historical record, thereby reducing computational iterations required to determine driver assignments, wherein the dispatch learning model is trained using (i) logistics data regarding thousands of instances of training order data of respective orders including in-gate times and outgate times associated with one or more locations, (ii) respective location data of respective drivers, (iii) respective delivery routes of respective drivers, (iv) a plurality of formats of the training order data, (v) driver details for a plurality of drivers including at least one of: (a) a driver location or (b) a driver credential value, and (vi) driver vehicle details associated with the plurality of drivers including at least one of: (a) a fuel level or (b) a fuel consumption rate to accurately predict the driver logistics prediction value, the dispatch learning model being trained to output (a) one or more driver logistics prediction values corresponding to the training order data of the respective orders and (b) the training order data in the universal format wherein the dispatch learning model has at least one of: (i) a depth value associated with layers of the dispatch learning model or (ii) a width value associated with nodes in the layers of the dispatch learning model, the depth value and the width value being configured to decrease machine resources of the logistics server consumed during execution of the dispatch learning model, wherein the dispatch learning model decreases computational resources by reducing at least one of the depth value or the width value dimensionality requirement of machine resources of the logistics server, thereby freeing up computational resources of the logistics server;

generate a driver determination that identifies the driver to fulfill the order based on the driver logistics prediction value;

push the driver determination to the dispatch of the driver, wherein, responsive to receiving the driver determination, the dispatch app displays a first graphical user interface (GUI) depicting the driver determination;

receive an updated order status from the dispatch app of the driver indicating that the order is assigned to the driver; and update the dispatch learning model using the driver logistics prediction value to improve the accuracy of a subsequent driver logistics prediction value output by the dispatch learning model.

31. The tangible, non-transitory computer-readable medium of claim 30, wherein the instructions further cause the one or more processors to:

determine an order status corresponding to the order based on the order data; and responsive to determining that the order status indicates a grounded load, analyze, by the dispatch learning model, the order data to generate the driver logistics prediction value corresponding to the order data.

32. The tangible, non-transitory computer-readable medium of claim 30, wherein the order data is a plurality of dispatch intake forms in a plurality of formats, and the instructions further cause the one or more processors to:

extract respective order data from each of the plurality of dispatch intake forms;

standardize the respective order data into the universal format; and analyze, by the dispatch learning model, each of the respective order data to generate a respective driver logistics prediction value for each of the respective order data.

33. The tangible, non-transitory computer-readable medium of claim 30, wherein the instructions further cause the one or more processors to:

receive (i) the dispatch intake form in the first format from the one or more order data sources, (ii) driver details for a plurality of drivers including at least one of: (a) a driver location or (b) a driver credential value, and (iii) driver vehicle details associated with the plurality of drivers including at least one of: (a) a fuel level or (b) a fuel consumption rate; and analyze, by the dispatch learning model, (i) the order data in the universal format, (ii) the driver details, and (iii) the driver vehicle details to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details.

34. The tangible, non-transitory computer-readable medium of claim 30, wherein both the pick-up yard and the destination location are railway terminals, and the instructions further cause the one or more processors to:

determine an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieve, by accessing a plurality of dispatch applications (apps) of a plurality of drivers via an application programming interface (API), location information corresponding to a plurality of drivers;

responsive to determining that the order status indicates a grounded load, analyze, by the dispatch learning model, (i) the order data in the universal format and (ii) the location information to generate the driver logistics prediction value corresponding to the order data;

push the driver determination to a respective dispatch app of the driver, wherein, responsive to receiving the driver determination, the respective dispatch app displays the graphical user interface (GUI) depicting the driver determination; and responsive to the driver accepting the order via the driver determination, receive the updated order status from the respective dispatch app of the driver indicating that the order is assigned to the driver.

35. The tangible, non-transitory computer-readable medium of claim 30, wherein the instructions further cause the one or more processors to:

receive (i) the dispatch intake form in the first format from the one or more order data sources, (ii) driver details for a plurality of drivers including at least one of: (a) a driver location or (b) a driver credential value, and (iii)

driver vehicle details associated with the plurality of drivers including at least one of: (a) a fuel level or (b) a fuel consumption rate;

extract, by executing the character recognition routine, the order data from the dispatch intake form, wherein both the pick-up yard and the destination location are railway terminals;

determine an order status corresponding to the order based on the order data, wherein the order status includes at least one of: (i) an arrived status indicating a train transporting the order has arrived at the pick-up yard, (ii) a placed status indicating the order is ready for offloading from the train, or (iii) a grounded status indicating the order is ready for transportation from the pick-up yard to the destination location;

retrieve, by accessing a plurality of dispatch applications (apps) of a plurality of drivers via an application programming interface (API), location information corresponding to a plurality of drivers;

analyze, by the dispatch learning model, (i) the order data in the universal format, (ii) the driver details, (iii) the driver vehicle details, and (iv) the location information to generate the driver logistics prediction value corresponding to the order data, wherein the dispatch learning model is trained or provided with the logistics data regarding order data of respective orders, wherein the dispatch learning model is configured to output the one or more driver logistics prediction values corresponding to the order data of the respective orders, and wherein the driver logistics prediction value represents a time for a driver to complete the order based on (i) the driver location and (ii) time loss resulting from the driver refueling a vehicle corresponding to the driver vehicle details;

push the driver determination to a respective dispatch app of the driver, wherein, responsive to receiving the driver determination, the respective dispatch app displays the graphical user interface (GUI) depicting the driver determination; and responsive to the driver accepting the order via the driver determination, receive the updated order status from the respective dispatch app of the driver indicating that the order is assigned to the driver.

36. The tangible, non-transitory computer-readable medium of claim 30, wherein the driver proceeds to deliver the order using the optimal route.

37. The tangible, non-transitory computer-readable medium of claim 36, wherein the instructions further cause the one or more processors to:

receive a second updated order status from the dispatch app of the driver indicating a completion of the order by the driver.

38. The tangible, non-transitory computer-readable medium of claim 30, wherein the driver delivers the order before a cut-off time to prevent a corresponding delay.

39. The tangible, non-transitory computer-readable medium of claim 30, wherein the instructions further cause the one or more processors to:

cause the dispatch app of the driver to display a second GUI including a first portion of the driver determination, the first portion comprising a scheduled order section that displays accepted orders of the driver on a particular date including the order, track (i) an in-gate time of the driver arriving at the pick-up yard on the particular date and (ii) an outgate time of the driver departing the pick-up yard, include (i) the in-gate time of the driver arriving at the pick-up yard on the particular date and (ii) the outgate time as entries in the historical record to maintain the historical record, cause the dispatch app of the driver to display a third GUI 5 including a second portion of the driver determination, the second portion comprising an order travel details section and a selectable navigation button, the order travel details section indicating the pick-up yard of the order and the destination location of the order, and 10 responsive to receiving a selection indication of the selectable navigation button from the driver, causing the dispatch app of the driver to render a graphical display of a second optimal route associated with the driver to provide the driver with travel instructions 15 from the pick-up yard to the destination location.

\* \* \* \* \*